United States Patent

[11] 3,553,381

[72] Inventor Derek Leyburn
St. Laurent, Quebec, Canada
[21] Appl. No. 592,363
[22] Filed Nov. 7, 1966
[45] Patented Jan. 5, 1971
[73] Assignee The Bell Telephone Company of Canada
Montreal, Quebec, Canada

[54] TELEPHONE LINE TRANSFER CIRCUIT
23 Claims, 12 Drawing Figs.

[52] U.S. Cl. .......... 179/18
[51] Int. Cl. .......... H04m 3/54
[50] Field of Search .......... 179/18.03, 84, 84SS, 90, 90B

[56] References Cited

UNITED STATES PATENTS

| | | | |
|---|---|---|---|
| 1,760,823 | 5/1930 | Friendly .......... | 179/18 |
| 1,794,603 | 3/1931 | Friendly .......... | 179/18 |
| 2,274,760 | 3/1942 | Wicks .......... | 179/18 |
| 2,542,535 | 2/1951 | Kaelin .......... | 179/18 |
| 2,909,607 | 10/1959 | Nilsson et al. .......... | 179/18 |
| 3,363,063 | 1/1968 | Kandel et al. .......... | 179/18 |

*Primary Examiner*—Kathleen H. Claffy
*Assistant Examiner*—David L. Stewart
*Attorney*—Rogers, Bereskin and Parr

ABSTRACT: A telephone line transfer circuit that permits a subscriber to dial from his telephone any one of nine transfer codes to divert his incoming calls to any one of nine remote telephones, one for each transfer code. When a subscriber dials a transfer code, a transfer relay operates through a decoding network. The transfer relay switches the leads on which incoming calls are normally received away from the subscriber and through number generating means to an outgoing switching train. The decoding network also operates one of nine transfer number relays, and the operated transfer number relay sets the number generating means to generate the remote telephone number associated with the transfer code dialed. After generation of the remote number, the number generating means connects the caller through to the outgoing switching train and hence to the selected remote location.

INVENTOR.
DEREK LEYBURN

BY Rogers, Bereskin, & Parr

INVENTOR.
DEREK LEYBURN
BY
Rogers, Bereskin, & Parr

*INVENTOR.*
DEREK LEYBURN

BY *Rogers, Bereskin, & Parr*

INVENTOR.
DEREK LEYBURN

BY Rogers, Bereskin, & Parr

INVENTOR.
DEREK LEYBURN
BY Rogers, Bereskin, & Parr

INVENTOR.
DEREK LEYBURN

BY

Rogers, Bereskin, & Parr

INVENTOR.
DEREK LEYBURN
BY
Rogers, Bereskin, & Parr

INVENTOR.

DEREK LEYBURN

BY

Rogers, Bereskin and Parr

Attorneys

TELEPHONE LINE TRANSFER CIRCUIT

1. This invention relates to telephone line transfer circuits and foreign exchange circuits, and to pulse generation and associated control circuits that may be employed in such line transfer and foreign exchange circuits.

A line transfer circuit is a device used when a particular subscriber wishes that his calls be transferred to a telephone other than his normal telephone. Circuits have been available in the past to perform this function, but many of such circuits have required installation of special equipment, for example a switch, at the subscriber's telephone. In addition, in the past, line transfer circuits compatible with step by step and crossbar telephone exchanges presently in use have employed precut cams or stepping switches or the like for pulse generation. Such pulse generating components are subject to rapid wear and hence are unreliable, and in addition occupy a great deal of expensive floor space in a telephone exchange. Accordingly, it is an object of the present invention in one of its aspects to provide a line transfer circuit requiring no installation of equipment at the subscriber's telephone, and to provide improved pulse generation and other associated control circuits that may be used in such line transfer circuit.

Further objects and advantages of the present invention will appear from the following disclosure, taken together with the accompanying drawings, in which.

Figure 1:
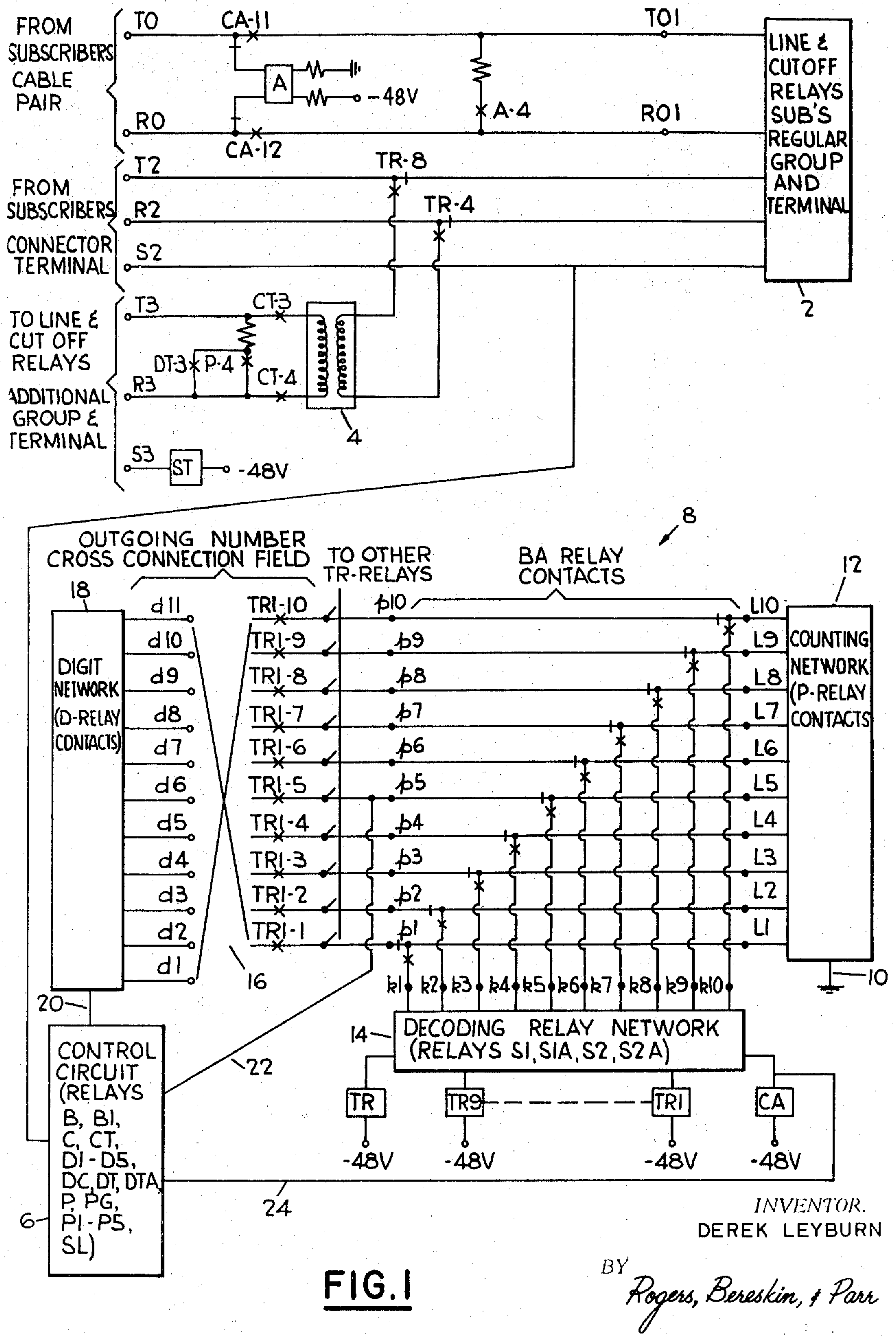
FIG. 1 is a block diagram showing the organization of the line transfer circuit.

In the drawings, detached contact notation is used throughout. Thus, the notation A on the drawings indicates the coil of relay A, while A–1 denotes contact number one of relay A. If contact A–1 is marked with a cross ($x$), then this contact is normally open, i.e. it is open when relay A is released while if the contact is marked with a bar (-), it is closed when relay A is released.

In addition, if components in a FIG. are enclosed or marked off by a double box, this indicates that such components are illustrated (usually in more detail) elsewhere but are reproduced in the FIG. in question for convenience.

LINE TRANSFER CIRCUIT

General Description

2. Reference is first made to FIG. 1 which illustrates in block diagram form a line transfer circuit according to the present invention. FIG. 1 is somewhat simplified, and an amplified description and illustration of the line transfer circuit will be presented shortly, but FIG. 1 illustrates the basic overall organization of the line transfer circuit.

With the line transfer circuit now to be described, a subscriber can have calls to his telephone transferred to any one of nine predetermined remote locations. The subscriber must advise the telephone company in advance as to the nine locations that he would like available, and the telephone company then will cross connect appropriate equipment in the exchange to achieve this objective. Then, when the subscriber wishes his calls to be directed e.g. to the first of the nine remote locations, he picks up his telephone and dials a particular transfer code, for example a three digit code such as 311. This activates the transfer circuit in the exchange so that all calls normally destined for the subscriber will now be automatically transferred to the first remote location and will ring the telephone at such remote location. If the subscriber wishes his calls transferred instead to the second remote location, he dials (in the embodiment to be described) the transfer code 312. Calls to his telephone will now automatically be transferred to the second remote location, and so on up to the ninth remote location. To release the transfer feature, the subscriber dials a release or restoration code, e.g. 310. Calls for the subscriber will then ring the subscriber's own telephone again.

2.1 Referring now to FIG. 1, there is shown a pair of tip and ring leads TO, RO leading from the subscriber's cable pair (i.e. from the subscriber's telephone) through cancel relay contacts CA–11 and CA–12 (the function of relay CA will be explained shortly) and through terminals TO1, RO1 to a block 2. The block 2 is conventional and consists of the subscriber's regular line and cutoff relays and linefinder group and terminal (or line link frame if a crossbar system is employed). A pulse receiving relay A is connected between terminals TO, RO through normally closed contacts of contacts CA–11 and CA–12, while a contact A–4 of relay A is connected between terminals TO1, RO1.

Also provided are leads T2, R2, S2 from the subscriber's connector terminal. Leads T2, R2 are connected, through transfer relay contacts TR–8, TR–4, both to the block 2 and, through a transmission bridge 4 and cut-through relay contacts CT–3, Ct–4, to outgoing leads T3, R3. Leads T3, R3 in turn lead to additional line and cutoff relays and an additional linefinder group and terminal (not shown). A contact P–4 of a pulsing relay P (to be discussed presently) and a contact DT–3 of a digit timing relay DT (also to be discussed shortly) are connected between terminals T3, R3.

Lead S2 from the subscriber's connector terminal is connected directly to the block 2, and also to a control circuit 6, while a lead S3 associated with leads T3, R3 is connected to a start relay ST.

When the subscriber wishes to make an outgoing call, he picks up his telephone, which loops terminals TO, RO (i.e. connects then together) and this operates relay A. Contact A–4 then closes to cause terminals TO1, RO1 to engage a linefinder which connects terminals TO1, RO1 to a first selector, so that an outgoing call may be made.

Incoming calls to the subscriber proceed over leads T2, R2 towards the block 2. When the transfer feature is not activated, the call is extended from leads T2, R2 to block 2 and thence through leads TO, RO to the subscriber, contacts CA–11 and CA–12 being operated at this time, as will be described.

2.2 When the line transfer feature is activated, a call incoming to the subscriber over leads T2, R2, S2 does not pass into the subscriber's regular group and terminal. Instead, the call is diverted by transfer relay contacts TR–8, TR–4 downwardly to outgoing tip and ring leads T3, R3. At the same time, the pulsing contact P–4 closes to loop leads T3, R3 and the loop causes a linefinder to connect a first selector to leads T3, R3. The pulsing relay contact P–4 then opens and closes to open and close the loop and send out, over leads T3, R3, a series of pulses representing the telephone number at the remote location selected. This effects a connection of the T3, R3 leads through the outgoing selector train to the remote location.

The pulsing contact P–4 then opens, and contacts CT–3 and CT–4 then close to cut leads T2, R2 through to leads T3, R3 The calling party is now connected, through leads T2, R2 and leads T3, R3, to the telephone at the remote transfer location selected.

2.3 The pulsing relay contact P–4, as well as the cancel relay CA contacts, transfer relay TR contacts and cut-through relay CT contacts, are controlled by the control means shown at the bottom half of FIG. 1 and indicated at 8. The control means 8 includes the control circuit 6, as mentioned. The control circuit 6 includes a number of relays to be discussed in more detail presently, but which are listed in the drawing and are also listed in Table I which follows shortly. For the moment, it will suffice to note that control circuit 6 includes the pulsing relay P, connected with another pulsing relay PG in a free running flip-flop arrangement, and also includes counting relays P1 to P5 (also termed the P– relays), digit relays D1 to D5 (also termed the D– relays), a routing relay BA, and contacts of the A relay.

Control means 8 is organized with a lead 10 extending from ground to a counting network 12 containing contacts of the P– relays. From the counting network 12 ten output counting leads L1 to L10 extend through normally open portions of contacts BA–1 to BA–10 to terminals *k*1 to *k*10, and thence to a decoding relay network 14. These leads then extend through the decoding network, in a manner to be described, to a set of transfer number relays TR1 to TR9 (also termed the TR– relays) and to the transfer relay TR and cancel relay CA.

The output leads L1 to L10 of counting network 12 also extend through normally closed portions of contacts BA–1 to BA–10 terminals p1 to p10, and thence through contacts 1 to 10 of the TR– relays (only one TR– relay, relay TR1, is shown) to one side of an outgoing number cross connection field 16.

The other side of the cross connection field 16 is connected to a set of digit terminals d1 to d11 connected in turn to a digit network 18 containing contacts of the D– relays. From the digit network 18, a hold conductor 20 extends to the control circuit 6. In addition, an auxiliary hold conductor 22 extends from terminal p5 to control circuit 6, and a conductor 24 extends from control circuit 6 to the cancel relay CA.

The control means 8 operates generally as follows.

3. Activation of the Transfer Feature

The subscriber activates the transfer feature by lifting his telephone and dialing a transfer code. The effect of this will be to activate the transfer relay TR to switch the T2, R2 leads away from the block 2 and down to the T3, R3 leads. A further effect of dialing the transfer code will be to preset the control means 8 (by operating an appropriate TR– relay) so that contact P–4 will outpulse the telephone number for the particular remote location selected and not that for some other remote location. This activation of relay TR and the presetting of the control means 8 occur as follows.

When a subscriber lifts his telephone and dials a digit, the control circuit 6 reacts to the resultant pulsing of relay A (as the subscriber loop opens and closes) in two ways. First, it operates routing relay BA to extend leads L1 to L10 to terminals *k*1 to *k*10. Secondly, after completion of dialing of the digit, it operates counting network 12 to extend a momentary ground from lead 10 onto whichever L-lead corresponds to the number of pulses in the digit dialed. In other words, each L-lead is associated with a different digit, so if the subscriber dials a 1, ground will be extended onto lead L1; if the subscriber dials a 2, ground will appear on lead L2, etc.

Assuming as mentioned that the transfer codes are 311 to 319 (each code is for a different remote location), after the subscriber dials the first digit 3 of the transfer code, ground is extended from lead 10 through network 12 onto lead L3 and thence through terminal *k*3 to decoding network 14. This operates a decoding relay in the decoding network. (If the first digit dialed is a digit other than a 3then cancel relay CA will operate instead, and contacts CA–11 and CA–12 will cut through leads TO, RO directly to the block 2 and prevent further operation of relay A. The subscriber is then connected directly to his selector train and the call continues as an ordinary outgoing call.)

The subscriber next dials the second digit 1 of the transfer code. Again, the control circuit 6 reacts (to the single pulse of relay A) to set the counting network to route a ground from lead 10 over lead L1 to the decoding network 14. This operates a second decoding relay in the decoding network. (If the second digit dialed were not the second transfer code digit, e.g. if it were a 2, then ground would appear at terminal *k*2 to cause relay CA to operate and the call would continue as an ordinary outgoing call.)

The decoding relays in the decoding network 14 are now set so that when the subscriber next dials a third digit, the ground extended over an L-lead from the counting network 12 is routed straight through the decoding relay network 14 to operate an appropriate TR– relay. For example, if the third digit dialed is a 1, a ground is extended over lead L1 to operate relay TR1. If the third digit dialed is a 4, a ground is extended over lead L4 to operate relay TR4. The TR– relays in operating adjust the outgoing number cross connection field 16 so that the desired number is outpulsed on receipt of an incoming call. If relay TR1 is operated, the number outpulsed on receipt of an incoming call will be that of the first remote location; if relay TR2 is operated, the number for the second remote location will be outpulsed, and so on. In addition, when any TR– relay operates, it causes operation of transfer relay TR. Relay TR then locks itself and the operated TR– relay operated until the restoration code is dialed.

4. Transferring a Call

Assume that the subscriber has dialed the transfer code 311 for the first remote location, so that relays TR and TRL are operated. Assume that the telephone number at the first remote location is, for example, 865-3211. In that case, relay TR1 will have adjusted the cross connection field 16 so that the following *p* leads are connected to the following *d* leads: ***p*8 to *d*1, *p*6 to *d*2, *p*5 to *d*3, *p*3 to *d*4, *p*2 to *d*5, *p*1 to *d*6, *p*1 to *d*7**.

When an incoming call to the subscriber occurs, the call is diverted to leads T3, R3 and the ground on lead S2 operates relays in the control circuit 6. The control circuit 6 now adjusts the digit network 18 so that digit terminal ***d*1 is connected to hold conductor 20, and in addition, pulsing of the relay flip-flop previously mentioned (comprising relays P and PG) now commences. As the relay flip-flop runs, it adjusts the counting network 12 so that ground appears sequentially on leads L1 to L10**, i.e. ground appears on lead L1 after one pulse of the flip-flop, on lead L2 after two pulses, and so on.

Therefore, ignoring interdigital timing intervals for purposes of simplicity, after eight pulses of relay P of the relay flip-flop, ground appears on lead L8 and is extended to terminal ***p*8 (relay BA is released during transfer calls). From terminal *p*8, ground is extended through contact TR1–8, cross connection field 16 to terminal *d*1, and thence through digit network 18 and hold conductor 20 back to control circuit 6**. This ground terminates operation of the relay flip-flop. Outpulsing of the first digit of the remote telephone number for the first transfer location is now complete, since contact P–4 has opened and closed eight times.

After an interdigital timing period (which may include a specified number of pulses of the relay flip-flop with contact P–4 short circuited by contact DT–3 operated), the relay flip-flop automatically restarts. At this time, the control circuit 6 adjusts digit network 18 so that digit terminal ***d*2 is connected to hold conductor 20 instead of terminal *d*1**. Outpulsing of the second digit 6 of the transfer number now begins.

After six pulses of relay P, ground appears on lead L6 and thence is extended through terminal ***p*6, contact TR1–6, cross connection field 16 to terminal *d*2, digit network 18, and hold conductor 20 back to control circuit 6 to terminate the pulsing. Outpulsing of the second digit is now complete. An interdigital timing interval next occurs, after which the control circuit 6 sets the digit network 18** to connect terminal *d*3 to hold conductor 20, and outpulsing of the third digit commences.

This process continues until all digits of the desired telephone number have been outpulsed, at which time the control circuit terminates further pulsing and operates the cut-through relay CT.

5. Release of the Transfer Feature

If the transfer codes are 311 to 319, then the restoration code will be 310. When the subscriber lifts his telephone to dial the restoration code, routing relay BA is operated as before, and appropriate grounds are extended from the counting network down to the decoding relay network 14 to release transfer relay TR and the activated TR– relay, e.g. relay TR1.

6. Incoming Calls to the Subscriber when the Transfer Feature is not Actuated

On all incoming calls, ground appears on the S2 sleeve from the subscriber's connector. When the transfer feature is not in effect, this ground is routed through the control circuit 6 and over conductor 24 to operate cancel relay CA, Contacts CA–11 and CA–12 then close, so that the incoming call is routed from leads T2, R2 to the block 2 and then through leads TO, RO to the subscriber.

7. Detailed Description

Reference is next made to FIGS. 2 to 5, where the line transfer circuit of FIG. 1 is shown in more detail. To facilitate understanding of the line transfer circuit, a list of all relays used therein (some of these relays have already been discussed), together with the FIG. in which the coil of each relay appears and a comment on the function of each relay, is presented in Table I below.

TABLE I

Relays used in line transfer circuit

A (Fig. 2)—Pulse receiving relay, operated by opening and closing of the subscriber's loop from the subscriber's cable pair.
B, C (Fig. 2)—Control relay operated from sleeve lead S2.
B1 (Fig. 5)—Control relay used in outpulsing a remote location telephone number and to prevent operation of relay BA.
BA (Fig. 3)—Routing relay used to direct grounds to the decoding network 14 during actuation and release of the transfer feature and to the p- terminals during outpulsing of a remote location telephone number.
CA (Fig. 6)—Cancel relay, operated when the subscriber dials a code other than a transfer code, and during incoming calls when the transfer feature is not in effect.
CT (Fig. 5)—Cut-through relay, used after outpulsing of the number at a transfer location, to terminate further outpulsing and to cut a transmission path through between leads T2, R2 and leads T3, R3.
D1 to D5 (Fig. 4)—Digit relays, also termed D-relays, used to determine which digit terminal dl to dll is to be connected to the hold conductor 20.
DC (Fig. 5)—Digit change relay, pulsed as the respective digits of the transfer number are outpulsed, and employed to step the D- relays through their sequence.
DT, DTA (Fig. 5)—Digit timing relay, used in interdigital timing. (Relays DT, DTA are very fast operate, on the order of one millisecond, since they control stopping and starting of pulsing.)
P (Fig. 5)—Pulsing relay, part of a relay flip flop, used to outpulse the transfer number and to step the P- relays through their sequence.
PG (Fig. 5)—Used with relay P and forming the other half of the relay flip flop used in outpulsing.
P1 to P5 (Fig. 3)—Counting relays, also termed P- relays, used to control routing of ground from lead 10 onto the L- leads.
S1, S1A, S2, S2A (Fig. 6)—Decoding relays used in activation of the transfer feature.
SL (Fig. 2)—Control relay used during transfer of an incoming call, to prepare operation of the relay flip flop (and, eventually, operation of the CT relay) and to prevent operation of the cancel relay CA.
ST (Fig. 2)—Start relay, used to permit initiation of pulsing of the relay flip flop once remote equipment at leads T3, R3 has become connected.
TR (Fig. 6)—Transfer relay, operated when the transfer feature is in effect and used to divert incoming calls.
TR1 to TR9 (Fig. 6)—Transfer number relays, a selected one of which is activated depending on the transfer code dialed, and used to adjust the outgoing number cross connections 16 so that the correct transfer number for the selected transfer location will be outpulsed.

The details of the line transfer circuit will best be appreciated from a description of its operation. To facilitate following of the description, sequence charts indicating the sequences of relay operations are provided in FIGS. 7 to 11. In the sequence charts, operation of a relay is indicated by an *x* and release of a relay is indicated by a "-."

8. Activation of the Transfer Feature Seizure 8.01 When the subscriber lifts his telephone, thus looping terminals TO, RO, relay A (FIG. 2) operates as mentioned. When relay A operates:

1. contact A–4 (FIG. 2) closes to provide a loop to the block 2 to seize a line finder and first selector (not shown).

2. contact A–8 (FIG. 2) closes to prepare an operate path for relay B.

3. contact A–10 (FIG. 2) opens to open one of the operate paths for relay C.

4. counting contacts A–6 (FIG. 3) operate to prepare operation of the P– relays.

Figure 2:
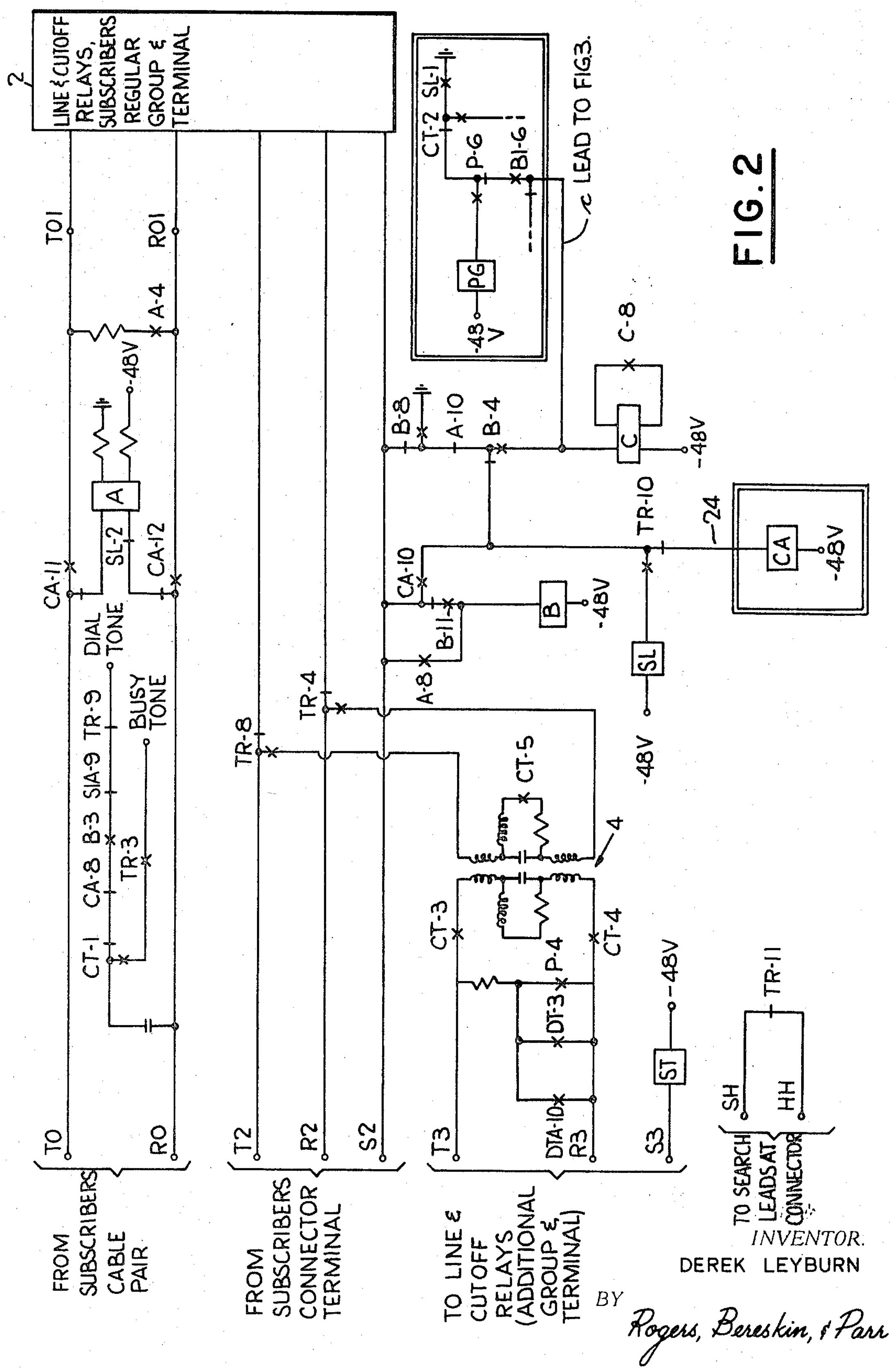
FIG. 2 shows the interconnections, through the line transfer circuit, of the subscriber's cable pair, leads from the subscriber's connector terminal, and outgoing leads for a transfer call.

8.02 When a line finder and first selector are seized, ground appears on lead S2 from the block 2. This ground is extended through contact A–8 operated, to operate relay B (FIG. 2). When relay B operates:

1. contact B–3 (FIG. 2) closes to connect dial tone to the subscriber.

2. contact B–11 (FIG. 2) closes to lock relay B operated to lead S2.

3. contact B–12 (FIG. 3) closes to prepare operation of counting relays P1 to P5.

4. contacts B–5 and B–9 (FIG. 3) close to prepare holding paths for the P– relays.

5. contacts B–1 and B–2 (FIG. 6) close to prepare locking paths for the decoding relays S1, S1A, S2, S2A.

First Digit of Transfer Code is Dialed 8.03 When the first digit 3 of the transfer code is dialed, relay A releases and reoperates three times (since the subscriber's loop is broken three times). This will result in operation of relays in the control circuit 6 (particularly the counting relays P1 to P5 shown in FIG. 3) to adjust the counting network 12 (shown in detail in FIG. 5) so that after completion of dialing of the digit 3, a momentary ground is directed from lead 10 onto lead L3 and thence to the decoding network 14. The detailed operation that achieves this result is as follows (see also the sequence chart, FIG. 7).

First Pulse 8.04 1. On the first release of relay A, contact A–10 closes and operates relay C, through contacts B–8 operated, A–10 released, and B–4 operated.

2. When relay C operates, contact C–8 (FIG. 2) closes to cause relay C to be slow release (its release time is typically about 200 milliseconds). Relay C will now hold operated during the remainder of the digit pulsing period.

In addition contact C–4 (FIG. 3) closes both to provide a holding ground for the P– relays and to operate routing relay BA (through contact B1–10 released). Contact C–2 (FIG. 5) opens to prevent ground from entering leads L1 to L10 until pulsing of the digit is completed.

3. In addition when relay A releases, its counting contacts A–6 (FIG. 3) release and relay P1 (FIG. 3) operates, through contacts A–6 released, B–12 operated, and P2–6 released. Relay P1 then locks operated through contacts P2–6 released, P1–1 operated, B–5 operated, and C–4 operated to ground.

End of First Pulse 8.05 1. When relay A reoperates at the end of the first pulse, contacts A–6 operate to operate relay P2, through contacts A–6 operated, C–6 or BA–11 operated, P1–11 operated, and P2–12 released.

2. Relay P2 then locks operated through operated contacts P2–12, P1–1, B–5 and C–4. Contacts P2–6 in operating transfer the locking path for relay P1 through contacts A–6 operated.

Second Pulse 8.06

1. On the second release of relay A, relay P1 releases due to release of contacts A–6. Relay P–2 remains operated through contacts P2–12 operated, B–12 operated, and P2–12 released.

2. In addition, relay P3 now operates, through released contacts P4–6, P5–6, P1–4, and operated contacts P2–11, B–5 and C–4. Relay P3 locks operated through contacts P3–11 operated; any of contacts P4–4 and P5–4, released or P2–1 operated or P1–8 released; B–5 operated; and C–4 operated to ground.

End of Second Pulse 8.07 When relay A reoperates, relay P2 releases due to release of contacts A–6. Of the P– relays, only relay P3 is now energized, as shown in the sequence chart FIG. 7.

Third Pulse 8.08 When relay A releases during the break period of the third pulse, relay P1 reoperates through contacts A–6 released, as before, and locks operated through contacts P2–6 released, P1–1 operated, B–5 operated and C–4 operated as before. Relay P3 remains operated.

End of Third Pulse 8.09 1. At the end of the third pulse relay A reoperates. Relay P2 now reoperates through contacts P2–12 released, P1–11 operated, C–6 operated, and A–6 operated.

2. When relay P2 operates, contact P2–11 closes and relay P4 operates through contacts P5–8 released, and operated contacts P3–1, P1–4, P2–11, B–5 and C–4. The situation is now that relays P1, P2, P3 and P4 are all operated.

8.10 In general, when the subscriber dials a digit, the P– relays will operate according to Table II below.

TABLE II

| | P- relays operated | | | | |
|---|---|---|---|---|---|
| Digit dialed: | | | | | |
| 1 | 1 | 2 | | | |
| 2 | | | 3 | | |
| 3 | 1 | 2 | 3 | 4 | |
| 4 | | | 3 | 4 | |
| 5 | 1 | 2 | | 4 | |
| 6 | | | | 4 | 5 |
| 7 | 1 | 2 | | 4 | 5 |
| 8 | | | 3 | 4 | 5 |
| 9 | 1 | 2 | 3 | | 5 |
| 10 | | | 3 | | 5 |

Extension of Momentary Ground Onto Lead L3 to Terminal *k*3

8.11 1. After the third pulse, no further pulses are forthcoming (since digit 3 has been dialed) and relay A remains operated. Contact A–10 (FIG. 2) thus remains open, causing slow release relay C to release. This opens contact C–4 (FIG. 3) but relays P1 to P4 and BA remain operated by virtue of a covering ground extended through contacts B–9 operated, CA–8 released, S1–3 released, and BA–12 operated.

2. With relay C released, contact C–2 (FIG. 5) closes and ground is extended from lead 10 into the counting network 12. This ground is extended through operated contacts P1–2, P2–3, P3–2, released contact P5–12, and operated contact P4–3 onto lead L3. From lead L3 the ground passes through contacts BA–3 operated (FIG. 5) and hence to terminal *k*3 (FIG. 5) of the decoding network 14.

Figure 6:
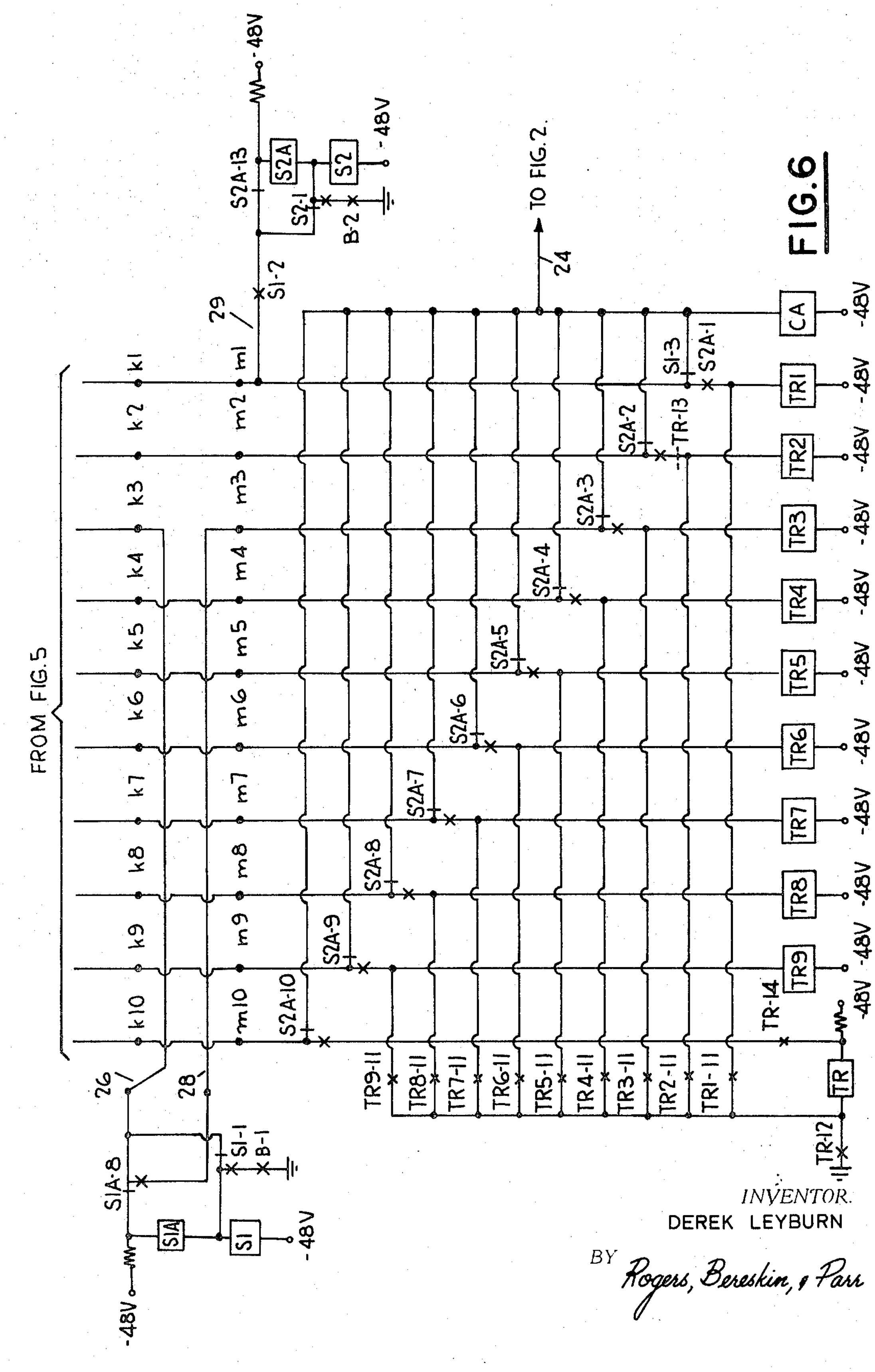
FIG. 6 shows the decoding network circuit.
Figure 7:
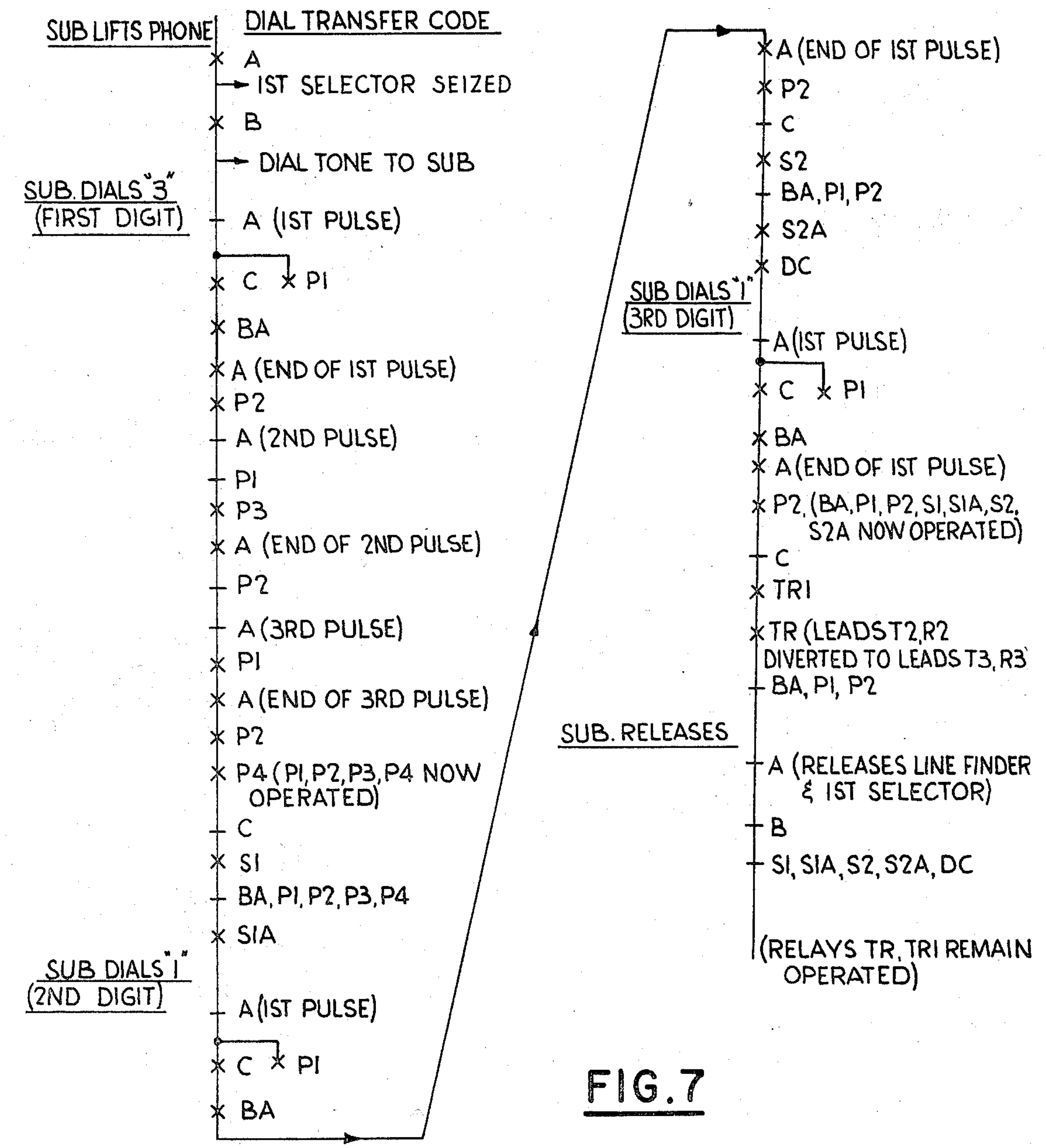
FIG. 7 is a sequence chart showing the sequence of events when a transfer code is dialed.

Operation of Decoding Relays S1 and S1A 8.12 1. As shown in FIG. 6, the decoding network 14 is provided with 10 terminals *m*1 to *m*10 cross connected to terminals *k*1 to *k*10. Leads 26, 28 are provided extending to relays S1, S1A. In the case where the first digit of the transfer code is a 3, leads 26, 28 are cross connected between terminals *k*3, *m*3, so that after the subscriber dials this first transfer code digit (causing ground to appear at terminal *k*3), relays S1, S1A will operate. If the first digit of the transfer code were to be a 4 instead of a 3, then leads 26, 28 would be connected between terminals *k*4, *m*4.

2. After digit 3 is dialed and ground is extended onto terminal *k*3, item 8.11 (2), relay S1 operates through contacts S1–1 released, and then locks operated through operated contacts S1–1 (which are make before break) and B–1. Relay S1A cannot operate at this time since it is shunted by the ground from terminal *k*3 extended over contacts S1A–8 released.

3. When relay S1 operates, its contact S1–3 (FIG. 3) opens to remove the covering ground, item 8.11 (1), for relays P1 to P4 and BA, which now all release, removing the ground from terminal *k*3. With ground removed from terminal *k*3, relay S1A is no longer shunted and operates from –48*v* through operated contacts S1–1 and B–1. Contacts S1A–8 (FIG. 6) operate to prevent any further grounds received on terminal *k*3 from shunting relay S1A and to connect terminal *k*3 directly to terminal *m*3.

4. Contact S1A–9 (FIG. 2) operates to remove dial tone from the subscriber at this time. Receipt of the first digit of the transfer code has now been registered, by operation of decoding relays S1 and S1A. When relay S1 operates, its contact S1–2 (FIG. 6) closes to prepare a path for operation of decoding relays S2 and S2A, provided the correct second transfer code digit is dialed, as will be described.

Had a digit other than a 3 been dialed as the first digit, then relays S1 and S1A would not have operated. Assume for example that the first digit dialed is a 5. In that case, after dialing the 5, ground will be extended onto lead L5 to terminal *k*5 and then to terminal *m*5, and through contacts S2A–5 released (FIG. 6) to operate cancel relay CA Contacts CA–11 and CA–12 (FIGS. 1 and 2) will then operate to prevent further operation of relay A and to connect the subscriber directly to his block 2 so that the call can then progress as an ordinary outgoing call, while contact CA–8 opens to remove dial tone from the subscriber permanently during the call. Contacts CA–10 (FIG. 2) operate to release relay B and to lock relay CA operated to sleeve lead S2 (see FIG. 3), and contacts B–12, B–5 and B–9 open to release any operated P– relays. Relay C releases (due to release of contacts B–4, FIG. 2) to release relay BA.

Second Transfer Code Digit is Dialed 8.15

The subscriber next dials the second digit of the transfer code, namely a 1. This causes a single pulse in the subscriber's loop. The result will be to extend ground from lead 20 onto lead L1 and hence to terminal *k*1 to operate the second set of decoding relays S2 and S2A. The operation is as follows:

1. On the break period of the pulse, relay A releases. Contact A–10 (FIG. 2) closes to operate relay C from lead S2, and contacts A–6 (FIG. 3) operate to energize relay P1, as previously described. Contact C–4 closes to operate relay BA.

2. When relay A reoperates at the end of the pulse and remains operated, contacts A–6 (FIG. 3) release to operate relay P2, so that relays P1 and P2 are now operated (as shown in Table II).

3. With no further pulses forthcoming, slow release relay C (FIG. 2) releases and ground is extended (FIG. 5) from lead 10 through contacts C–2 released, P1–2 and P2–3 operated, and P3–2 and P4–8 released onto lead L1. Although relay C is released, relays P2 and BA (FIG. 3) remain operated by virtue of a covering ground extended through contacts B–9 operated, CA–8 released, S2–2 released, S1A–10 operate, and A–12 operated. Relay P1 remains operated through contact BA–11 operated.

4. From lead L1, the ground is extended through contacts BA–1 operated to terminal *k*1, which is in turn connected to terminal *m*1 (FIG. 6). As shown, terminal *m*1 is coupled, through a lead 29, to relays S2, S2A. The ground on terminal *m*1 now operates relay S2, through contacts S1–2 operated and S2–1 released. Relay S2 locks operated through operated contacts S2–1 and B–2. Relay S2A cannot yet operate since it is shunted by the ground on terminal *m*1 applied through contact S2A–13 released.

5. When relay S2 operates, contact S2–2 (FIG. 3) opens to remove the covering ground for relays P2 and BA, which release, and contact BA–11 opens to release relay P1. This removes ground from terminal *k*3, hence removing the ground shunt from relay S2A, which now operates. Contacts S2A–1 to S2A–10 operate to connect terminals *k*1 to *k*10 directly to the transfer relays TR1 to TR9 and transfer relay TR. (In addition contact S2A–12 (FIG. 5) operates to operate relay DC but this performs no function during activation of the transfer feature).

Receipt of the second digit of the transfer code has now been registered, by operation of the second set of decoding relays S2 and S2A. If some digit other than the correct second digit (a 1 ) had been dialed, then again the cancel relay CA would have been operated (through one of contacts S2A–2 to S2A–10 released, and the call would have continued as an ordinary call.

It is desired that the second transfer code digit be some digit other than 1, e.g. a 2, then lead 29 (FIG. 6) would be connected to terminal *m*2 instead of to terminal *m*1. In addition, contact S1–3 (connected in the lead between terminal *m*1 and the cancel relay CA to prevent cancel relay operation should a 1 be dialed after the correct first digit 3 of the transfer code has been dialed) would be placed in the lead between terminal *m*2 and the cancel relay in place of the normally closed portion of contacts S2A–2. A normally closed contact of relay S2A would replace contact S1–3 in the lead between *m*1 and relay CA

Third Digit of Transfer Code is Dialed 8.16

1. The subscriber next dials the third transfer code digit, which could be any digit from a 1 to a 9 in the embodiment illustrated. This will cause operation of relay TR and one of the TR– relays, e.g. relay TR1 if a 1 is dialed, relay TR2 if a 2 is dialed, etc., Assume that a 1 is dialed. In that case, as previously described and as shown in the sequence chart FIG. 7, after completion of dialing of the 1, relays P1, P2, C and BA are operated. Relays B, S1, S1A, S2, S2A, are of course already operated.

2. With no further pulses forthcoming contact A–10 (FIG. 2) remains open and relay C releases. This opens contacts C–4 and C–6 (FIG. 3) but relays P2, BA remain operated by a covering ground through contact B–9 operated, CA–8 released, TR–6 released, and S2A–11, S1A–10, BA–12 operated, while relay P1 remains operated through contact BA–11.

3. Release of relay C also opens contact C–2 (FIG. 5) and ground is extended from lead 10 through contacts P1–2 and P2–3 operated, P3–2 and P4–8 released, lead L1, contacts BA–1 operated, terminal *k*1 (FIG. 5), terminal *m*1, and contacts S1–2 and S2A–1 operated to operate relay TR1.

4. When relay TR1 operates, its contact TR1–11 closes to direct the ground on terminal *m*1 to relay TR. This operates relay TR.

5. When relay TR operates, it locks itself and relay TR1 operated through contact TR–12. Contacts TR–6 (FIG. 3) release to remove the covering ground to relays P2 and BA, which release causing release of relay P1. (Contacts TR–6 are break before make contacts, to ensure removal of the covering ground, since relay DC and hence contacts DC–11 (FIG. 3) are presently operated, item 8.15 (5).)

6. Operation of relay TR operates contacts TR–8 and TR–4 (FIG. 2) to divert leads T2, R2 down to leads T3, R3. At the same time contact TR–9 (FIG. 2) opens to remove dial tone to the subscriber so long as the transfer feature remains in effect, as an indication to him (when he later picks up his telephone) that the transfer feature has been actuated. Contacts TR–10 (FIG. 2) operate to prepare an operate path for relay SL (FIG. 1) and to prevent relay CA from operating to the ground on lead S2 when an incoming call is received.

7. In addition, contacts TR1–1 to TR1–10 (FIG. 5) operate to establish the correct set of cross connections between the *p*– and *d*– terminals FIGS. 1 and 5) so that the telephone number outpulsed (when a call is received) will be that of the first transfer location.

Had the subscriber dialed e.g. a 9 as his third digit, then relay TR9 would have operated instead of relay TR1 and would have established a different set of cross connections between the *p*– and *d*– terminals, for outpulsing a different telephone number.

If it is desired to provide fewer than nine possible transfer locations, e.g. only two transfer locations, than relays TR3 to TR9 will be removed and replaced by conductors leading to cancel relay CA. In that case, if the subscriber dials 311 (or 312), relays TR and TR1 (or TR2) will be operated, but if the subscriber dials 313 to 310, cancel relay CA will be operated instead.

Subscriber Releases After Dialing Transfer Code 8.17

After the subscriber has dialed a transfer code, he hangs up. The resulting sequence of events is shown in the last part of the sequence chart of FIG. 7.

When the subscriber hangs up, the loop at terminals TO, RO (FIGS. 1 and 2) is broken and relay A releases. Contact A–4 opens to release the line finder and first selector at the subscriber's regular group and terminal 2. The release of the selector removes ground from sleeve lead S2, thus releasing relay B (FIG. 2). Contacts B–1 and B–2 (FIG. 6) now open to release decoding relays S1, S1A, S2, S2A, and contact S2A–12 (FIG. 5) opens to release digit change relay DC. Relays TR and TR1 remain operated, and may remain operated for long periods of time, for which reason they are provided with high resistance coils to minimize overheating.

As mentioned, when the subscriber now picks up his telephone, the absence of dial tone will indicate to him that the transfer feature is in effect. Despite this, the subscriber may still make an outgoing call from his telephone (unless a transferred call is in progress) as will be described presently.

Receipt and Transfer of a Call 9.

Figure 8:
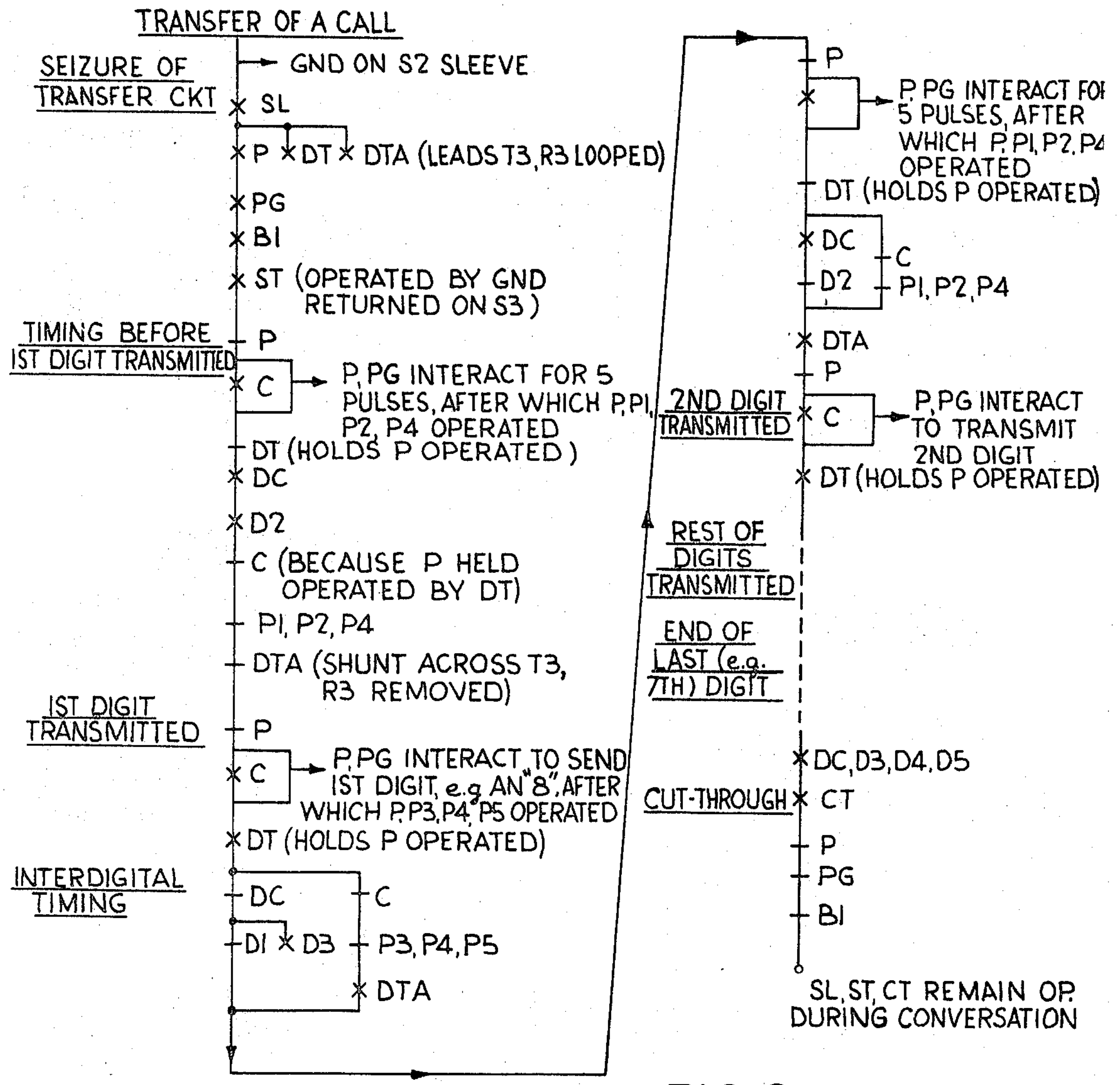
FIG. 8 shows the sequence of events when a call is being transferred.
Figure 10:
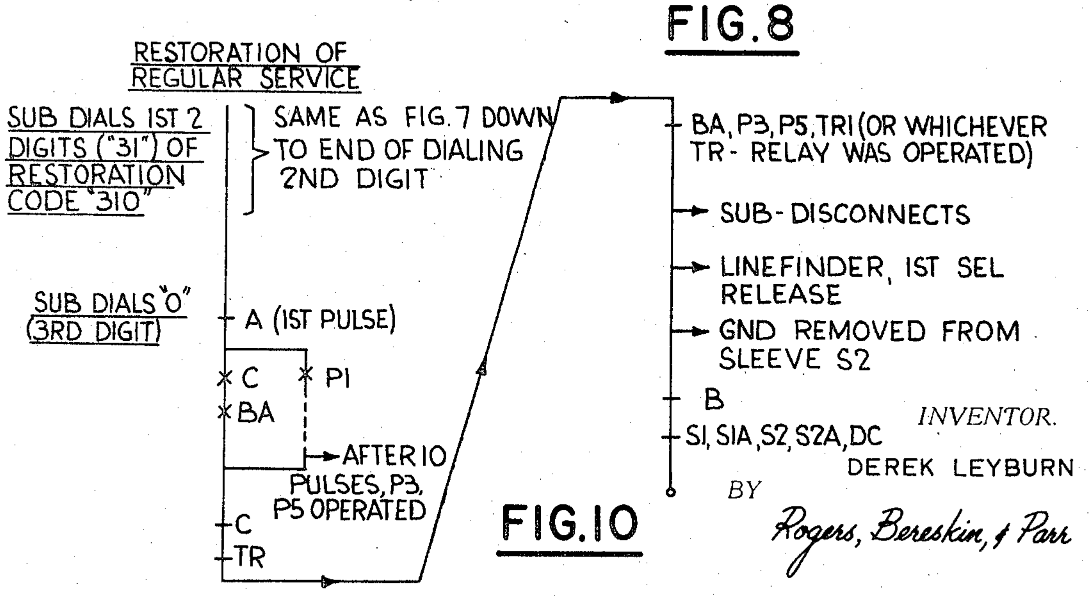
FIG. 10 shows the sequence of events when the restoration code is dialed.

The sequence of events occurring upon receipt of an incoming call, and consequent transfer of this call to the transfer location selected (assumed for purposes of illustration to be the first transfer location) is illustrated in the sequence chart of FIG. 8.

Assume that the transfer feature has now been activated as previously described, by the subscriber's dialing the transfer code 311 so that relays TR and TR1 are energized. Assume that a calling party now makes a call to the subscriber.

Seizure 9.01

When a call to the subscriber is extended to the subscriber's connector terminal, ground appears on sleeve lead S2 (FIGS. 1 and 2) and operates relay SL, through released contacts B–8, A–10, B–4, and operated contacts TR–10. When relay SL operates:

1. Its contact SL–2 (FIG. 2) opens the operate path for relay A, so that while a transferred call is in progress, the subscriber cannot by dialing interfere with such call.

2. It contact SL–1 (FIG. 5) closes to operate relays P, DT and DTA. Relay P operates through contacts SL–1 operated, CT–2 released, and either ST–8 or PG–7 released. Relays DT and DTA operate through contacts SL–1 operated, and CT–2, D1–6, D2–8, D3–5, D4–7, and D5–5 released, and contact DT–4 closes to prepare a holding path for relays DT, DTA.

9.02

When relays P, DT and DTA operate, their contacts (see FIG. 2) P–4, DTA–10, DT–3 close to loop leads T3, R3. This causes these leads to engage an additional line finder and selector (or line link frame if the office is a crossbar office).

9.03

At the same time, contacts P–6 (FIG. 5) operate to operate relay PG and contact PG–4 (FIG. 5) closes to operate slow release relay B1. Relay B1 will remain energized during outpulsing of the transfer number. When relay B1 operates:

1. Contact B1–3 (FIG. 5) closes to prepare a holding path for relay DC, and to complete a holding path for relays DT, and DTA.

2. Contact B1–9 (FIG. 5) closes to extend ground from lead 10 into the counting network 12.

3. Contact B1–2 (FIG. 3) closes to prepare for control of counting relays P1 to P5 by counting contacts P–8 of pulsing relay P, while contact B1–4 closes to prepare a locking path for the P– relays.

4. Contact B1–5 (FIG. 4) closes to operate digit relay D1, while contact B1–12 closes to provide a locking path for relay D1.

5. Contact B1–10 (FIG. 3) opens to prevent operation of routing relay BA.

6. Contacts B1–6 (FIGS. 2 and 3) operate to prepare an operate path for relay C. 9.04

When ground is returned on sleeve lead S3, indicating that a first selector is connected thereto, start relay ST operates. This ends the seizure sequence of events.

Timing Before Pulsing First Digit of Remote Number 9.05

Before the first digit of the remote number is outpulsed, a timing period occurs, to ensure that remote equipment is fully connected to terminals T3, R3. This timing interval, as will be explained, consists of five pulses of relay P with pulsing contact P–4 (FIG. 2) shorted by contacts DT–3 and DTA–10 operated, plus the release time of relay C (about 700 milliseconds in all).

Figure 3:
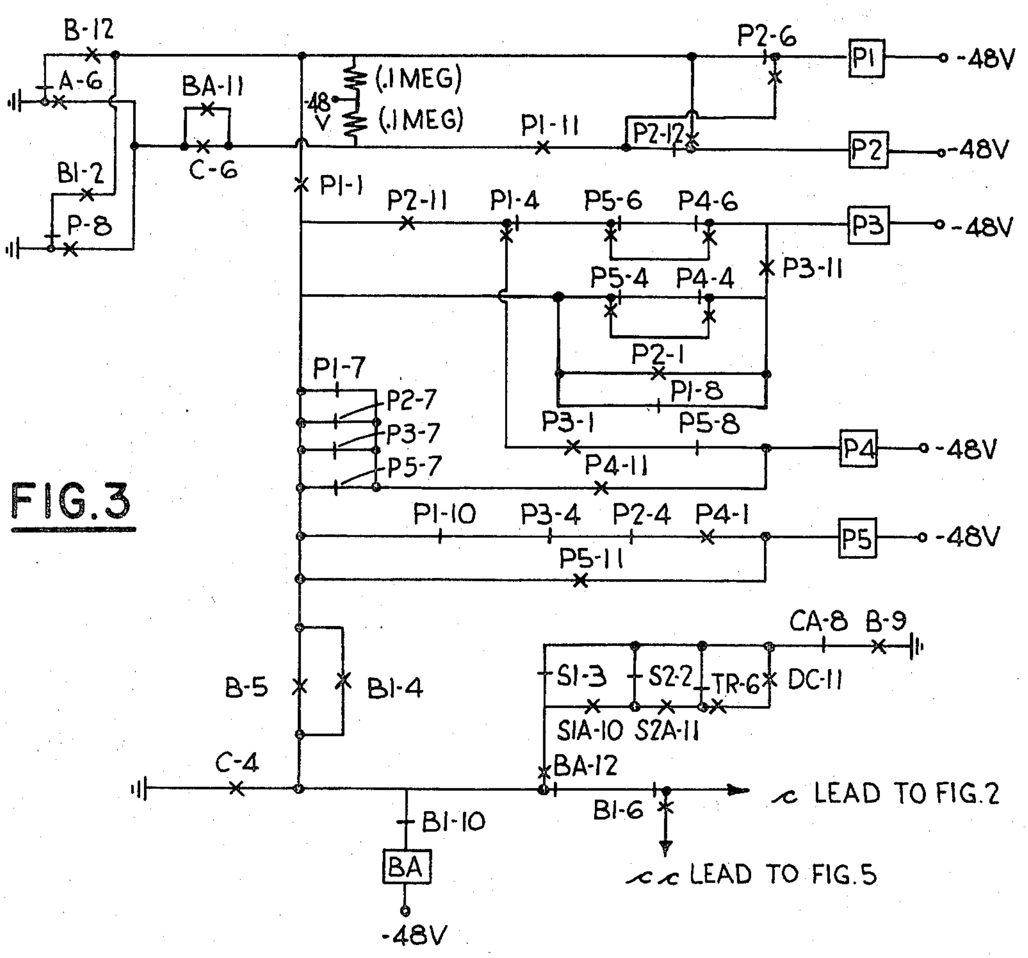
FIG. 3 shows the connections for the counting (P—) relay coils.
Figure 4:
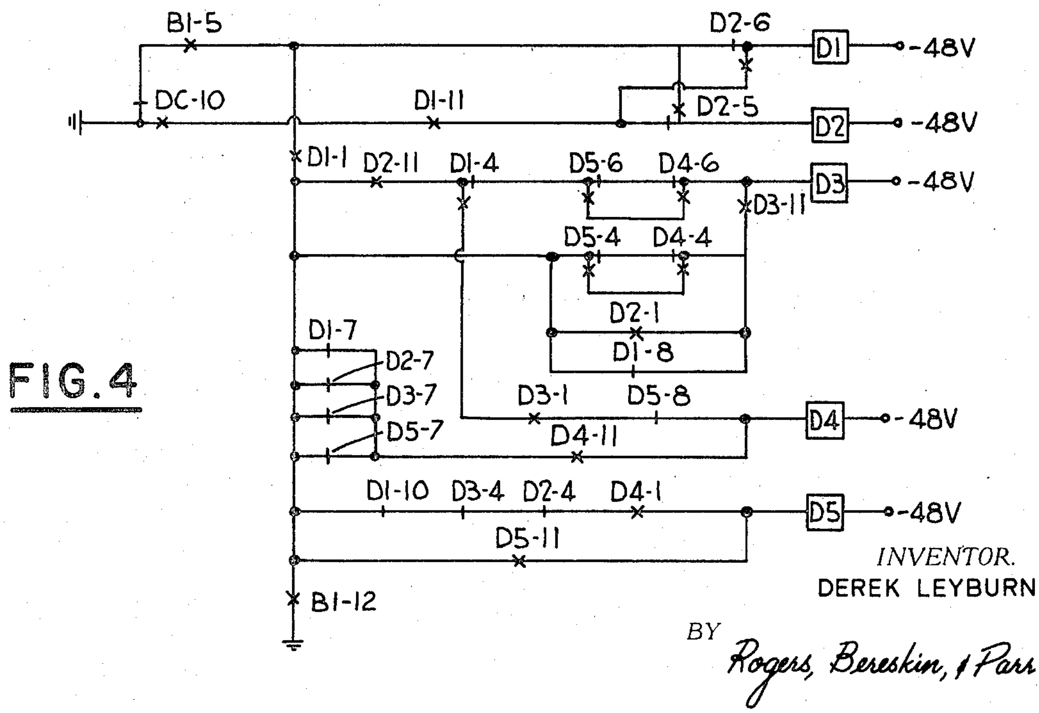
FIG. 4 shows the connections for the digit (D—) relay coils.

It should first be noted that relay P now controls the counting relays P1 to P5 (by means of counting contacts P–8, FIG. 3) in the same way as did relay A (by means of counting contacts A–6, FIG. 3). Further, the coils of digit relays D– (FIG. 4) are connected in the same way as those of the P– relays and are controlled by counting contacts DC–10 (FIG. 4) of the digit change relay DC in the same way as the P– relays are controlled by the A or P relays. The sequence of operation of the P– and D– relays, as the A, P or DC relays are pulsed, is set out in Table III below. (Table III is simply an expanded version of Table II.)

TABLE III

| Pulse (or Digit) | A or P (or DC relay) | P- (or D-) relays operated | | | | |
|---|---|---|---|---|---|---|
| 1 | Released | 1 | | | | |
| | Operated | 1 | 2 | | | |
| | Released | | 2 | 3 | | |
| 2 | Operated | | | 3 | | |
| | Released | 1 | | 3 | | |
| 3 | Operated | 1 | 2 | 3 | 4 | |
| | Released | | 2 | 3 | 4 | |
| 4 | Operated | | | 3 | 4 | |
| | Released | 1 | | | 4 | |
| 5 | Operated | 1 | 2 | | 4 | |
| | Released | | 2 | | 4 | |
| 6 | Operated | | | | 4 | 5 |
| | Released | 1 | | | 4 | 5 |
| 7 | Operated | 1 | 2 | | 4 | 5 |
| | Released | | 2 | | 4 | 5 |
| 8 | Operated | | | 3 | 4 | 5 |
| | Released | 1 | | 3 | | 5 |
| 9 | Operated | 1 | 2 | 3 | | 5 |
| | Released | | 2 | 3 | | 5 |
| 10 | Operated | | | 3 | | 5 |
| | Released | 1 | | | | 5 |
| 11 | Operated | 1 | 2 | | | 5 |
| | Released | | 2 | | | 5 |
| 12 | Operated | | | | | 5 |

9.06

Pulsing of a relay P to provide part of the pretransmission timing interval just mentioned occurs as follows.

When relay ST (FIG. 2) operates, item 9.04, its contact ST–8 (FIG. 5) opens. This releases relay P, since the other operate path for relay P, through contact PG–7 released, disappeared when relay PG operated.

Relays P and PG now interact in a flip-flop action, turning each other on and off. When relay P releases, contacts P–6 release, releasing relay PG, and when relay PG releases, contact PG–7 closes to reoperate relay P. This in turn operates contacts P–6 to operate relay PG again, thus releasing relay P, and the flip-flop action continues.

In addition, when contacts P–6 (FIGS. 2 and 5) release at the first release of relay P, relay C (FIG. 2) operates and contact C–8 closes to cause relay C to be slow release.

9.07 As relay P is pulsed, contacts P–8 (FIG. 3) pulse to step the P– relays through the sequence of Table III. It will be apparent from FIG. 5 that, as the P– relays go through their sequence, ground appears on lead L1 after one pulse, on lead L2 after two pulses, etc. After five pulses, relays P, P1, P2, P4 are operated and ground appears on lead L5 (through operated contacts B1–9, P1–2, P2–3, released contacts P3–2, operated contacts P4–8, and released contacts P5–2).

The ground on lead L5 is extended (FIG. 5) through contacts BA–5 released and DTA–11 operated onto auxiliary hold conductor 22 to shunt relay DT and release the same. When relay DT releases:

1. contacts DT–2 (FIG. 5) release and this provides a path from ground through contacts DT–2 released and DTA–9 operated to hold relay P operated, thus terminating the flip-flop action.

2. Contact DT–4 (FIG. 5) opens to remove one of the holding paths for relay DTA, which however remains operated through operated contacts DTA–12, any of P1–12, P2–10 and P4–12, and B1–3.

3. Contacts DT–5 (FIG. 5) release causing operation of relay DC.

Figures 9, 11:
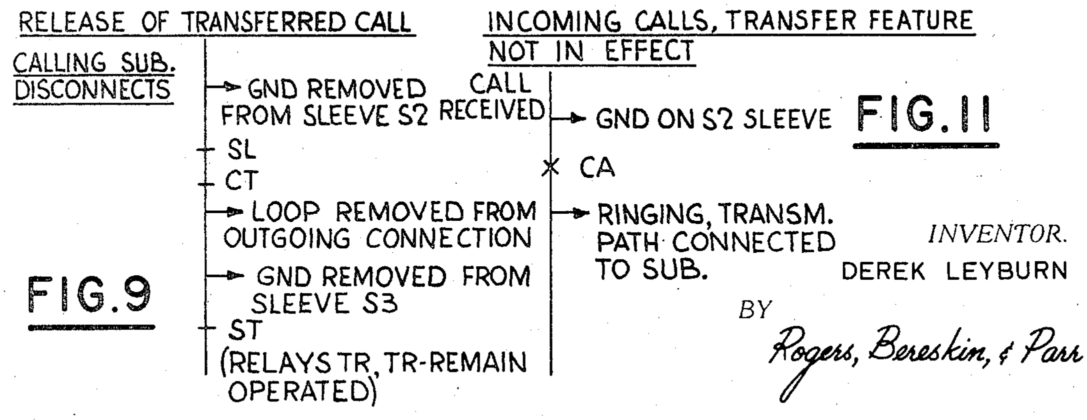
FIG. 9 shows the sequence of events when a transferred call terminates.
FIG. 11 shows the sequence of events when an incoming call is received with the transfer feature not in effect.

9.08 When relay DC operates, its counting contacts DC–10 (FIG. 4) operate to operate relay D2, so that relays D1 and D2 are now operated, as set out in table III and as may be seen from the sequence chart, FIG. 9. With relays D1 and D2 operated, digit terminal $d1$ (FIG. 5) is now connected to hold conductor 20 (through released contacts D5–1, D4–8, D3–2, and operated contacts D2–3 and D1–2) in readiness for outpulsing the first digit of the remote telephone number.

9.09 With relay P held operated (as discussed in item 9.07 (1)), contacts P–6 release, thus opening the operate path to relay C, which releases after about 200 milliseconds. When relay C releases, its contacts C–4 and C–6 (FIG. 3) open to release relays P1, P2 and P4. This opens contacts P1–12, P2–10, P4–12 (FIG. 4) to release relay DTA.

9.10 With both relays DT and DTA now released, contacts DT–3 and DTA–10 (FIG. 2) are both open, removing the short circuit from pulsing contact P–4, in preparation for outpulsing the first digit of the remote number. Opening and closing of contact P–4 will now open and close the loop across terminals T3, R3.

In addition (refer to FIG. 5), when relay DTA releases contacts DTA–9 release, and since contacts DT–2 are released, the holding path for relay P disappears. Relay P now releases and flip-flop action commences for transmission of the first digit.

Pulsing the Remote Number, First Digit 9.11 Assume (as mentioned in item 4) that the telephone number at the first transfer location is 865-3211, so that relay TR1 has adjusted cross connection field 16 such that the following p– terminals (FIG. 5) are connected to the following d– terminals respectively (through contacts TR1–1 to TR1–7).

p– terminals: 8 6 5 3 2 1 1 d– terminals: 1 2 3 4 5 6 7 Note also that since relays D1 and D2 are operated (item 9.08), digit terminal d1 is now connected to hold conductor 20.

9.12 Transmission of the first digit now commences with pulsing of relay P (item 9.10). On the first release of relay P, relay C (FIG. 2) operates, due to release of contacts P–6. Relay C remains operated for the remainder of the pulsing of the digit due to operation of contact C–8.

Figure 5:
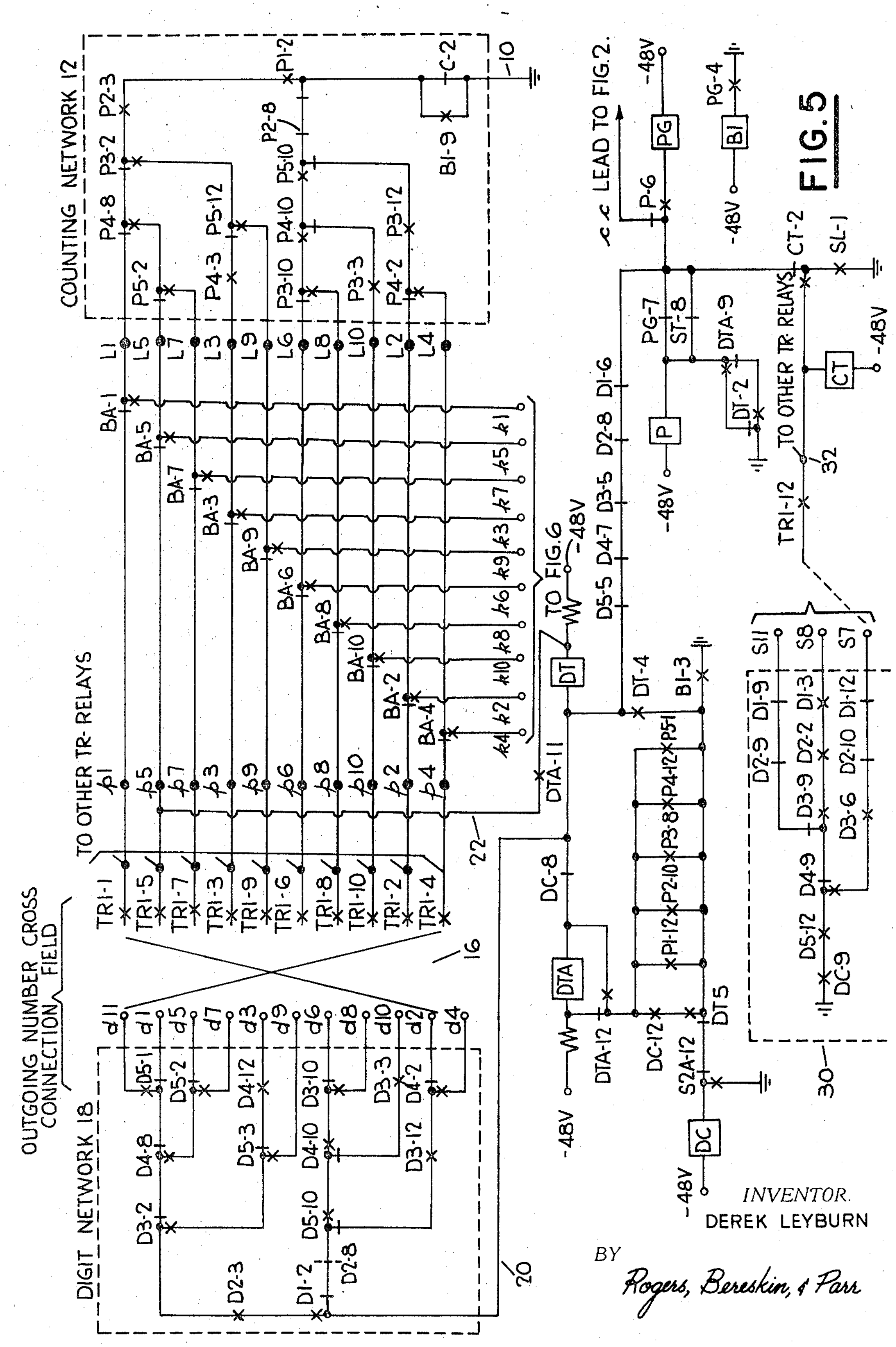
FIG. 5 shows details of the counting and digit networks, the relay flip-flop circuit and digit change relay, and the cut-through relay operating circuit.

During pulsing of relay P, ground appears sequentially at terminals p1, p2, etc. (FIG. 5). When ground reaches terminal p5, it cannot reach auxiliary hold conductor 22 because of open contact DTA–11 and in any event, relay DT is now released so that ground on conductor 22 would have no effect. After eight pulses of relay P, relays P3, P4 and P5 are operated and ground appears at terminal p8. Since terminal p8 is cross connected to terminal d1, and since terminal d1 is connected (by virtue of operated relays D1 and D2) to hold conductor 20, this ground is extended onto hold conductor 20 to operate relay DT, which locks operated through contact DT–4. Relay DTA cannot operate at this time since it is ground short circuited through contacts DTA–12 released, any of contacts P3–8, P4–12 and P5–1 operated, and contact B1–3 operated.

9.13 When relay DT operates, contacts DT–2 (FIG. 5) operate to hold relay P operated (through contacts DTA–9 released) thus terminating the pulsing of relay P. Transmission of the first digit, an 8, is now complete.

Interdigital Timing between First and Second Digits 9.14 An interdigital timing interval next occurs, before pulsing of the second digit of the remote number is commenced. This interdigital timing interval, which consists of two releases of relay C plus five pulses of relay P (with pulsing contact P–4 short circuited so that no pulses are sent out) occurs as follows.

9.15 When relay DT operates from ground on hold conductor 20 after the eighth pulse to hold relay P operated (item 9.13), contacts DT–5 (FIG. 5) operate to release relay DC. Contacts DC–10 (FIG. 4) then release to release relay D1 and operate relay D3 (see Table III — relays D2 and D3 are now operated).

In addition, when relay P is held operated, contacts P–6 (FIGS. 2 and 5) remain operated, so that relay C releases (after about 200 milliseconds). When relay C releases, its contact C–4 (FIG. 3) opens to release relays P3, P4 and P5. This removes the ground short circuit from relay DTA, due to opening of contacts P3–8, P4–12, P5–1, permitting relay DTA to operate to the ground through operated contacts DT–4 and B1–3.

9.16 When relay DTA operates, contacts DTA–9 (FIG. 5) operate and since contacts DT–2 are already operated, the holding path for relay P disappears and flip-flop action recommences. Pulsing contact P–4 (FIG. 2) is at this time short circuited by operated contacts DT–3 and DTA–10.

9.17 As relay P pulses and steps the P– relays through their sequence, ground appears sequentially on terminals p1, p2, etc. (Depending on the cross connections between the p– and d– terminals, a ground could at this time find its way onto hold conductor 20, but it would have no effect since relays DT and DTA are already operated. The possibility of a ground appearing on conductor 20 at this time could if desired be removed by insertion in digit network 18, between contacts D1–2 and D5–10, of a normally closed contact D2–8 similar to contact P2–8 in the counting network 12.)

After five pulses of relay P, relays P, P1, P2, P4 and C are operated and ground appears at terminal p5 and is extended through contact DTA–11 operated onto auxiliary hold conductor 22 to shunt relay DT and hence release the same. Relay DTA remains operated through operated contacts DTA–12; any of P1–12, P2–10, P4–12; and B1–3. The operation is now set out in item 8.06 to 9.10.

9.18 When relay DT releases, its contacts DT–2 (FIG. 5) release, providing a path from ground through contacts DT–2 released and DTA–9 operated to hold relay P operated and terminate the pulsing. Contacts DT–5 (FIG. 5) release to reoperate relay DC thus releasing relay D2 (see Table III) so that only relay D3 is now operated, in preparation for outpulsing the second digit of the transfer number.

In addition, with relay P held operated, contacts P–6 (FIGS. 2 and 5) operate to release relay C, and contacts C–4, C–6 (FIG. 3) open to release relays P1, P2, P4. This opens contacts P1–12, P2–10 and P4–12, opening the locking path for relay DTA, which thus releases.

With both relays DT and DTA released, contacts DT–3 and DTA–10 (FIG. 2) open to remove the short circuit from contact P–4 in preparation for pulsing of the second digit, and contacts DT–2 and DTA–9 (FIG. 5) are both released to remove the holding path for relay P. Relay P thus releases to initiate further flip-flop action, for transmission of the second digit.

Pulsing The Remote Number, Second Digit 9.19 In the example being discussed, the second digit of the remote number is a 6, so that terminal p6 is connected to terminal d2 through contact TR1–2.

Relays P and PG now interact until six pulses have occurred, at which time relays P, C, P4 and P5 are operated (see Table III), and ground will be extended from lead 10 through counting network 12 onto lead L6 and terminal p6, then through the cross connection field 16 to terminal d2 and through contacts D4–2 released, D3–12 operated, and released contacts D5–10 and D1–2 onto hold conductor 20 to operate relay DT and terminate the pulsing. Transmission of the second digit is now complete.

Pulsing the Remainder of the Remote Number 9.20 After the outpulsing of the second digit of the remote number, another interdigital timing interval occurs, during which digit change relay DC releases and reoperates once more to prepare the circuit for outpulsing the third digit. As seen from Table III, this release and reoperation of relay DC results in relays D1, D2, D3 and D4 being operated, so that digit terminal d3 is connected to hold conductor 20.

Since the third digit to be outpulsed is a 5, terminal p5 is as mentioned connected to terminal d3 (through contact TR1–3) Thus, after five pulses of relay P, ground appears on terminal p5 and is extended to conductor 20 to operate relay DT and terminate the pulsing. The remaining digits are outpulsed in the same manner, the number of pulses for each digit thus being controlled by the cross connections between the p— and d— terminals.

End of Pulsing and Cut-Through 9.21 In the example under consideration, the remote telephone number at the first transfer location has seven digits. Accordingly, after the prescribed seven digits have been sent out pulsing is terminated and cut-through relay CT (FIG. 5) is operated, to close contacts CT–3, CT–4 (FIG. 2) and cut leads T2, R2 through to leads T3, R3.

The cut-through relay CT is operated by a cut-through relay actuating network 30 shown in FIG. 5. This network is shown by way of example as having three terminals, S7, S8, and S11 (stop after 7, 8, or 11 digits respectively), Each terminal S7, S8, S11 is connected to ground through an appropriate sequence of D— and DC relay contacts and each terminal is cross connected through a contact 12 of a TR— relay to a terminal 32 leading to relay CT. In the example illustrated, contact 12 of relay TR1 only is shown.

9.22 In operation, after the seventh digit has been sent out, an interdigital timing interval occurs during which relay DC releases and reoperates once to set up the D— relays for transmission of an eighth digit. Relays DC, D3, D4 and D5 (see Table III) are now operated.

With relays DC, D3, D4, D5 operated, a path is extended from ground through operated contacts (see FIG. 5) DC–9, D5–12, D4–9, D3–6, released contacts D2–10, D1–12, and operated contact TR1–12 to operate relay CT.

9.23 When relay CT operates:

1. Contacts CT–2 (FIG. 5) operate to lock relay CT operated (through operated contact SL–1) and to release relay P. Relay P now remains released.

2. When relay P releases, contacts P–6 (FIG. 5) release to release relay PG, and contact PG–4 opens to release slow release relay B1.

3. When relay B1 releases, its contacts B1–2 and B1–4 (FIG. 3) open to release any operated P— relays, while contacts B1–5 and B1–12 (FIG. 4) open to release any operated D— relays. In addition, contacts B1–6 (FIGS. 2 and 3) release to open the operate path of relay C, while contact B1–3 (FIG. 5) releases relay DC. In short, relay B1 in releasing releases all operated relays except relays SL, ST and CT, which remain operated during conversation.

4. Contacts CT–3 and CT–4 (FIG. 2) close to connect the transmission path from leads T2, R2 to leads T3, R3 while contact CT–5 closes to trip the ring in the subscriber's connector and terminate ringing supplied by the subscriber's connector to the calling party. Ringing is now supplied to the calling party from the remote location.

Should the telephone at the remote location be busy, the calling party will hear ringing tone while the transfer number is being outpulsed followed by busy tone once a transmission path has been cut-through.

9.24 If the subscriber had wished his calls transferred to the second instead of to the first transfer location, he would have dialed the second transfer code, assumed to be 312. This would have activated relay TR2 instead of relay TR1, and relay TR2 would have adjusted cross connection field 16 so that the telephone number at the second remote location would be outpulsed. Suppose that the number at the second location were 1–416–487–3447, a direct dialed long-distance call. In that case, the following p— terminals would be connected to the following d— terminals (through contacts of relay TR2):

p— terminals: 1 416 487 3 4 4 7 d— terminals: 1 234 567 8 9 10 11 In addition, terminal S11 (FIG. 4) would be connected to terminal 32 through contact TR2–12 (only contact TR1–12 is shown), to terminate outpulsing and operate relay CT after outpulsing of 11 digits.

10. Release of the Transferred Call

The line transfer circuit and outgoing connection are held under the control of the calling party. The sequence of events occurring when the calling party disconnects is shown in the sequence chart of FIG. 9. When the calling party disconnects, ground is removed from sleeve lead S2 (FIG. 2), thus releasing relay SL. When relay SL releases, its contact SL–1 (FIG. 5) opens to release cut-through relay CT. When relay CT releases, contacts CT–3 and CT–4 (FIG. 2) open to remove loop from the outgoing connection, which in turn causes removal of ground from sleeve lead S3, causing relay ST to release. The circuit is now idle, but relay TR, and relay TR1 or whichever TR— relay was activated, remain operated.

11. Release of the Transfer Feature

In the embodiment being described, the transfer codes are 311 to 319, and the release code is 310. When the subscriber dials this code, the transfer feature will be released and normal service restored. The sequence of events occurring when the release code is dialed is illustrated in the sequence chart of FIG. 10.

When the subscriber picks up his telephone to dial the release code, he hears no dial tone, since transfer relay TR is actuated and hence contact TR–9 (FIG. 2) is open, removing dial tone from the subscriber's loop. Nevertheless, the subscriber may proceed to dial the release code. When the first two digits, 3 and 1, are dialed, the result is the same as that described for the activation of the transfer feature (items 8.01 to 8.15), namely that the first and second pairs of decoding relays S1, S1A, S2, S2A are activated.

11.2 When the subscriber dials the third digit, namely a 0, relay A (FIG. 2) releases at the break period of the first pulse as previously described, thus energizing relays C and P1, and contact C–4 (FIG. 3) energizes routing relay BA as before. After 10 pulses of relay A, relays P3 and P5 are operated (see Table II or III and the sequence chart of FIG. 10), and with no further pulses forthcoming, relay A remains operated and relay C releases (due to opening of contact A–10, FIG. 2).

11.3 With relay C released, contact C–2 (FIG. 5) closes and ground is extended from conductor 10 through network 12 to terminal k10 (FIG. 6) and hence to terminal m10 to shunt down relay TR, causing relay TR to release. To ensure that relay TR fully releases, relays BA, P3 and P5 are maintained operated by a hold ground (FIG. 3) extended through operated contact B–9, released contact CA–8 and operated contacts DC–11, TR–6, S1A–10, and BA–12 operated until relay TR has fully released.

11.4 When relay TR releases, its contacts TR–6 (FIG. 3) release to release relays P3, P5 and BA, and its contact TR–12 (FIG. 5) opens to release relay TR1 (or whichever TR— relay was operated).

11.5 The subscriber now disconnects, causing the line finder and first selector (not shown) connected to his regular group and terminal 2 to release, ground then being removed from sleeve lead S2 (FIG. 2) to release relay B. The release of relay B causes all other operated relays (namely relays S1, S1A, S2, S2A, DC) to release. The subscriber may then lift his receiver and the presence of dial tone (indicating that contact TR–9, FIG. 2, is now released) indicates that the transfer feature has been released.

11.6 If the subscriber picks up his telephone to release the transfer feature while a connection exists between a calling party and the telephone at the remote location selected, then he will hear a busy tone. This occurs because relays TR and CT are then both operated, thus operating contacts TR–3 and CT–1 (FIG. 2) to connect the busy tone to the subscriber's loop. In addition, as may be noted from the sequence chart of FIG. 8, when a transferred call is in progress, relay SL is operated and hence contact SL–2 (FIG. 2) is open preventing operation of relay A. Therefore, any dialing by the subscriber at this time will be ineffective so that he cannot cut off in the middle a call for him directed to the transfer location. After the transferred call terminates, relays SL and CT release, and the subscriber may then restore his normal service.

11.7 If it is desired to prevent the possibility of operation of two TR– relays at the same time due to subscriber misuse, then, as shown in FIG. 6 in dotted lines for relay TR-3, for example, late break contact TR-13 of relay TR may be placed between contacts S2A-3 and relay TR-3 to prevent operation of relay TR-3 (provided that it is not operated) once relay TR is operated. A similar connection may be provided for each of the other TR– relays. With such an arrangement, once the transfer feature is in effect and a particular remote location has been selected, the subscriber must dial the release code before activating the transfer feature to select a different remote location.

12. Making an Outgoing Call When the Transfer Feature is Activated

When the transfer feature is in effect, the subscriber will hear no dial tone when he lifts his telephone receiver, but he may still make an outgoing call. When he dials the first digit of the outgoing call, if this first digit is e.g. a 4, i.e. a digit other than the first digit of the transfer code, then after he has dialed this digit, ground will be extended from conductor 10 through network 12 to terminal *k*4 (FIG. 5) to operate the cancel relay CA. Contacts CA-11 and CA-12. (FIG. 2) then operate to extend the subscriber's loop directly through to the regular selector train and to terminate further operation of relay A, while contact CA-8 removes dial tone from the subscriber.

If the first digit is the same as the first digit of the transfer code but the second digit is a digit other than the second digit of the transfer code, then when the second digit is dialed, ground is extended from conductor 10 to a *k*terminal and thence over a released contact of relay S2A to operate cancel relay CA, again to place the outgoing selector train under direct control of the subscriber's loop.

13. Modifications 13.1 If the subscriber to be provided with line transfer service has more than one line (so that if one line is in use, a call to the subscriber will progress over another line), then as shown in FIG. 2, the search leads SH and HH at the subscriber's connector are interrupted by a contact TR-11 of relay TR. Thus, when relay TR operates, the search leads to all the subscriber's lines except the first are opened, the first subscriber line being indicated by leads T2, R2 and being diverted to leads T3, R3 when the transfer feature is actuated.

13.2 The description has assumed that the interdigital timing includes five pulses of relay P with pulsing contact P-4 short circuited, but other means for providing an interdigital timing interval could also be employed. For example, suitable delay means such as slow release relays could be employed. A portion of a typical control circuit employing such an interdigital timing arrangement is shown in FIG. 12, where corresponding reference numerals indicate like parts.

Figure 12:
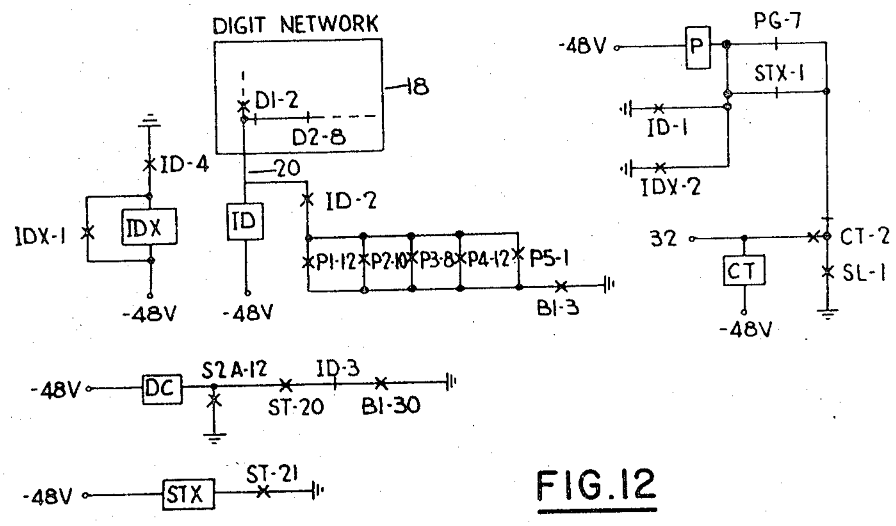
FIG. 12 shows a modification for the line transfer circuit.

In the FIG. 12 arrangement there is provided a fast operate interdigital timing relay ID, and a fast operate auxiliary relay IDX which once operated, is slow release by virtue of its contact IDX-1. In addition, an auxiliary start relay STX is provided, relay STX being slow operate.

When a start signal is received from sleeve lead S3 (FIG. 2) to operate start relay ST, contact ST-20 operates relay DC to operate relay D2 in preparation for pulsing the first digit (item 9.08) while contact ST-21 operates relay STX. Contact STX-1 then opens to release relay P to permit transmission of the first digit to commence.

After the desired number of pulses of relay P, ground appears on hold conductor 20 (auxiliary hold conductor 22 is no longer needed) to operate relay ID, and contact ID-1 closes to terminate the pulsing. Relay ID locks operated through contact ID-2 and contacts of the P– relays; contact ID-3 releases relay DC; contact ID-4 operates relay IDX. Contact IDX-2 then closes to provide an auxiliary hold path for relay P.

When relay P is thus held operated, relay C releases (item 9.09) to release any operated P– relays thus to release relay ID. Contact ID-3 closes to reoperate relay DC, to set up the D– relays for transmission of the second digit. Contact ID-4 opens the operate path for relay IDX which, after the desired interdigital delay, releases. Contact IDX-2 then opens to permit pulsing of relay P to recommence for transmission of the second digit.

13.3 It has been assumed that the transfer codes are three digit codes, but two digit codes, or codes with more than three digits, could also be used, the same decoding network principles being applicable.

13.4 In the embodiment described, there are 10 counting conductor combinations, one associated with each digit from 1 to 0, each counting conductor combination consisting of one counting conductor. However, each of the 10 counting conductor combinations could consist of more than one counting conductor, e.g. each could comprise two counting conductors, using the 2 out of 5 code, in which case only five counting conductors would be needed. The same approach could be used with the digit terminal combinations, in which case the form of the counting and digit networks 12 and 18, and of the decoding network 14, would be changed appropriately.

13.5 The embodiment of the line transfer circuit described has also assumed that the digits received from the subscriber are in dial pulse form. If the subscriber is provided with touch tone dialing facilities, then relay A may be replaced by a touch tone receiver, such receiver having an output arranged to supply a ground on one lead out of 10, depending on the digit received, to operate the decoding network 14. If the remote location telephone number to be generated is in dial pulse form, the same output circuit as previously described may be used. If the remote location number is to be generated in multifrequency form, then a multifrequency number generating circuit will be used.

I claim:

1. Pulse generating apparatus, comprising:

a. a pulsing relay, including a set of counting contacts having an operated condition and a released condition;

b. control circuit means connecting said pulsing relay for free running change of state action of said pulsing relay, thus effecting pulsing of said counting contacts;

c. means coupled to said means (b) for selectively initiating and terminating said free running action of said pulsing relay;

d. a plurality of counting conductors;

e. means for connection to a source of reference potential;

f. network means coupled between said counting conductors and said means (e) and responsive to the number of pulses of said counting contacts after initiation of said free running action to connect successive different counting conductors to said means (e) as said counting contacts undergo successive pulses;

g. hold conductor means, and means connecting said hold conductor means to said means (c) for appearance of said reference potential on said hold conductor means to terminate free running action of said pulsing relay;

h. means for connecting said hold conductor means to at least one selected counting conductor, so that after occurrence of a predetermined number of pulses of said counting contacts, said network means couples said means (e) to said at least one selected counting conductor and thence through said means (h) to said hold conductor means to terminate said free running action of said pulsing relay, said means (h) comprising:

i. a digit change relay, including a set of digit change contacts having an operated condition and a released condition, j. means coupled between said digit change relay and said means (c) for stepping said digit change relay through at least one change of state following termination of said free running action of said pulsing relay.

k. a plurality of digit conductors, l. cross connection means connecting said counting conductors and said digit conductors; and m. digit network means coupled between said digit conductors and said hold conductor means and responsive to changes in condition of said digit change contacts to connect different digit conductors to said hold conductor means as said digit change contacts undergo changes in condition, for varying, following each termination of free running action of said pulsing relay, said at least one counting conductor coupled to said hold conductor means, so that following occurrence of said predetermined number of pulses of said counting contacts and consequent connection of said reference potential to said at least one counting conductor and thence through said cross connection means, said digit conductors, and said digit network means to said hold conductor means to terminate said free running action of said pulsing relay, said digit change relay is stepped through at least one change of state for said digit network means to connect a new counting conductor to said hold conductor means.

2. Pulse generating apparatus, comprising:

a. a pulsing relay having a coil and counting contacts, said pulsing relay having an operated state and a released state;

b. control circuit means connecting the coil of said pulsing relay for free running change of state action of said pulsing relay, thus effecting pulsing of said counting contacts;

c. means coupled to said means (b) for selectively initiating and terminating said free running action of said pulsing relay;

d. a plurality of counting relays each having a coil and a plurality of contacts;

e. counting circuit means interconnecting the coils of said counting relays, selected contacts of said counting relays, and said counting contacts for operation, upon pulsing of said counting contacts, of said counting relays in a plurality of successive different operating combinations as said counting contacts undergo successive pulses;

f. an output circuit for said counting relays, said output circuit comprising:

1. a plurality of counting conductors,
2. means for connection to a source of reference potential, and
3. counting network means, including contacts of said counting relays, coupled between said counting conductors and said means (f) (2) for connecting successive different counting conductors to said means (f) (2) for successive different operating combinations of said counting relays, the appearance of said reference potential on different counting conductors indicating occurrence of different numbers of pulses of said counting contacts;

g. hold conductor means, and means connecting said hold conductor means to said means (c) for appearance of said reference potential on said hold conductor means to terminate free running action of said pulsing relay;

h. and means for connecting said hold conductor means to at least one selected counting conductor, so that after occurrence of a predetermined number of pulses of said counting contacts, said counting relays reach an operating combination to connect said means (f) (2) through said counting network means, said at least one counting conductor, and said means (h) to said hold conductor means to terminate said free running action of said pulsing relay, said means (h) comprising:

i. a digit change relay having a coil and digit change contacts, said digit change relay having an operated state and a released state, j. means coupled between said digit change relay and said means (c) for stepping said digit change relay through at least one change of state following termination of pulsing of said counting contacts, k. a plurality of digit relays each having a coil and a plurality of contacts, l. means interconnecting the coils of said digit relays, selected contacts of said digit relays, and said digit change contacts for operation, upon change of state of said digit change contacts, of said digit relays in a plurality of successive different operating combinations as said digit change contacts undergo successive changes in condition, m. an output circuit for said digit relays, said output circuit comprising:

1. a plurality of digit conductors,
2. digit network means, including contacts of said digit conductors, coupled between said digit conductors and said hold conductor means for connecting different digit conductors to said hold conductor means for different operating combinations of said digit relays, n. cross connections means connecting said counting conductors and said digit conductors, so that, following occurrence of said predetermined number of pulses and consequent connection of said reference potential to said at least one counting conductor and thence through said cross connection means, said digit conductors, and said digit network means to said hold conductor means to terminate said free running action of said pulsing relay, said digit change relay changes state at least once to effect a new operating combination of said digit relays for said digit network means to connect a new counting conductor to said hold conductor means, said apparatus further including a plurality of transfer number relays each having a plurality of contacts, said cross connection means (n) comprising a plurality of cross connection fields, one such cross connection field associated with each transfer number relay and each cross connection field being coupled between said counting and digit conductors through contacts of its associated transfer number relay, so that any one of said plurality of cross connection fields may be connected between said counting and digit conductors by selection of its associated transfer number relay.

3. Apparatus according to claim 2 wherein said counting relays are five in number, namely, first to fifth counting relays, P1, P2, P3, P4, P5, said means (e) operating said counting relays in the following operating combinations of counting relays for successive pulses of said pulsing relay and hence of said pulsing contacts, a pulse of said pulsing relay being a cycle of said pulsing relay through two successive changes in state,

| | Counting relays operated | | | |
|---|---|---|---|---|
| Pulses of pulsing relay: | | | | |
| 1 | P1 | P2 | | |
| 2 | P3 | | | |
| 3 | P1 | P2 | P3 | P4 |
| 4 | P3 | P4 | | |
| 5 | P1 | P2 | P4 | |
| 6 | P4 | P5 | | |
| 7 | P1 | P2 | P4 | P5 |
| 8 | P3 | P4 | P5 | |
| 9 | P1 | P2 | P3 | P5 |
| 10 | P3 | P5 | | |

and said counting conductors being ten in number, from one to ten, said counting network means connecting said means (f) (2) to the following counting conductors through the following contacts of said counting relays:

1. to the first counting conductor, through normally open contacts of relays P1, P2 and normally closed contacts of relays P3, P4;
2. to the second counting conductor, through normally closed contacts of relays P1, P2, P4 and P5, and a normally open contact of relay P3;
3. to the third counting conductor, through normally open contacts of relays P1, P2, P3 and P4 and a normally closed contact of relay P5;

4. to the fourth counting conductor, through normally closed contacts of relays P1, P2, P5 and normally open contacts of relays P3, P4;
5. to the fifth counting conductor, through normally open contacts of relays P1, P2, P4 and normally closed contacts of relays P3, P5;
6. to the sixth counting conductor, through normally closed contacts of relays P1, P2, P3 and normally open contacts of relays P4, P5;
7. to the seventh counting conductor, through normally open contacts of relays P1, P2, P4, P5 and a normally closed contact of relay P3;
8. to the eighth counting conductor, through normally closed contacts of relays P1, P2, and normally open contacts of relays P3, P4, P5;
9. to the ninth counting conductor, through normally open contacts of relays P1, P2, P3, P5; and
10. to the 10th counting conductor, through normally closed contacts of relays P1, P2, P4 and normally open contacts of relays P3, P5.

**4. For a telephone system, a pulsing relay having a pulsing contact for transmission of dial pulses, said pulsing relay also having counting contacts, pulsing of said pulsing relay operating and releasing said pulsing and counting contacts; and a control system for pulsing said pulsing relay to effect transmission by said pulsing contact of a predetermined sequence of digits, the digits of said sequence being *n* in number, namely a number one in position digit, a number two in position digit, up to a number *n* in position digit, each digit being represented by pulses of said pulsing contact, with an interdigital timing interval between each digit of said sequence, said control system comprising:**

a. means for connection to a source of reference potential;

b. a plurality of counting conductors for providing ten different counting conductor combinations, namely, a first counting conductor combination, a second counting conductor combination, up to a 10th counting conductor combination;

c. counting network means coupled between said means (a) and said counting conductors and responsive to the number of pulses of said counting contacts after initiation of pulsing of said pulsing relay to connect individually in succession said ten counting conductor combinations to said means (a) as said counting contacts undergo successive pulses, said first counting conductor combination thus being associated with one pulse of said pulsing contacts, said second counting conductor combination being associated with two pulses of said pulsing contacts, up to said 10th counting conductor combination being associated with ten pulses of said pulsing contacts, said counting network means having an initial released condition in which none of said counting conductor combinations are connected to said means (a);

d. a digit change relay having an operated condition and a released condition, and having an initial state in which it is in one of its conditions;

**e. a plurality of digit conductors for providing *n* different digit conductor combinations, one such combination for each of the *n* digits of said sequence, namely, a number one digit conductor combination associated with the number one in position digit of said sequence, a number two digit conductor combination associated with the number two in position digit of said sequence, up to a number *n* digit conductor combination associated with the number *n* in position digit of said sequence, each of said digit conductor combinations comprising at least one digit conductor;**

f. hold conductor means;

g. digit network means coupled between said digit conductors and said hold conductor means and responsive to changes in state of said digit change relay to connect said digit conductor combinations individually in succession to said hold conductor means as said digit change relay undergoes successive cycles of operation, commencing with said number one digit conductor combination and ending with said number *n* digit conductor combination;

h. cross connection means comprising a cross connection field connecting: the counting conductor combination representative of the number of pulses for the number one in position digit to said first digit conductor combination; the counting conductor combination representative of the number of pulses for the number two in position digit to said second digit conductor combination; up to the counting conductor combination representative of the number of pulses for the number *n* in position digit to the *n*th digit conductor combination; and i. and a control circuit for said pulsing relay, said digit change relay, and said counting network means, said control circuit comprising:

1. means responsive to a start signal from said telephone system to initiate signal transmitting free running action of said pulsing relay to commence transmission of the pulses of said digits,
2. means connected to said hold conductor means and responsive to appearance of said reference potential thereon to terminate said free running action and thus to terminate pulsing of said pulsing contact and counting contacts,
3. means for resetting said counting network means to its initial condition following each termination of pulsing of said counting contacts,
4. means for restarting said free running action of said pulsing relay following each termination of said free running action,
5. means coupled to said means (i) (4) for providing an interdigital timing interval between termination of said signal transmitting free running action and recommencement of said signal transmitting free running action of said pulsing contact, and
6. means for operating said digit change relay sequentially from its initial state on receipt of said start signal, through subsequent cycles following terminations of said signal transmitting free running action, whereby, after transmission of the number of pulses required for a digit of said sequence, said reference potential is extended through said means (a), said counting network means, a selected counting conductor combination, said cross connection means, said digit conductors, said digit network means, and said hold conductor means to terminate free running action of said pulsing relay and hence transmission of pulses by said pulsing contact, and following such transmission of a digit and an interdigital timing interval, said control circuit reinitiates signal transmitting free running action of said pulsing relay with a succeeding digit conductor combination connected to said hold conductor means.

5. For a telephone system, a pulsing relay having a pulsing contact for transmission of dial pulses, said pulsing relay also having counting contacts, pulsing of said pulsing relay operating and releasing said pulsing and counting contacts; and a control system for pulsing said pulsing relay to effect transmission by said pulsing contact of a predetermined sequence of digits, the digits of said sequence being *n* in number, namely, a number one in position digit, a number two in position digit, up to a number *n* in position digit, each digit being represented by a number of pulses of said pulsing contacts, with an interdigital timing interval between each digit of said sequence, said interdigital timing interval comprising a predetermined number of pulses of said pulsing contact with said pulsing contact short circuited, said control system comprising:

a. means for connection to a source of reference potential;

b. a plurality of counting conductors for providing ten different counting conductor combinations, namely, a first counting conductor combination, a second counting conductor combination, up to a tenth counting conductor combination;

c. counting network means coupled between said means (a) and said counting conductors and responsive to the number of pulses of said counting contacts after initiation of pulsing of said pulsing relay to connect individually in succession said ten counting conductor combinations to said means (a) as said counting contacts undergo successive pulses, said first counting conductor combination thus being associated with one pulse of said pulsing contacts, said second counting conductor combination being associated with two pulses of said pulsing contacts, up to said tenth counting conductor combination being associated with ten pulses of said pulsing contacts, said counting network means having an initial released condition in which none of said counting conductor combinations are connected to said means (a);

d. a digit change relay having an operated condition and a released condition, and having an initial state in which it is in one of its conditions;

e. a plurality of digit conductors for providing *n* different digit conductor combinations, one such combination for each of the *n* digits of said sequence, namely, a number one digit conductor combination associated with the number one in position digit of said sequence, a number two digit conductor combination associated with the number two in position digit of said sequence, up to a number *n* digit conductor combination associated with the number *n* in position digit of said sequence, each of said digit conductor combinations comprising at least one digit conductor;

f. hold conductor means;

g. digit network coupled between said digit conductors and said hold conductor means and responsive to changes in state of said digit change relay to connect said digit conductor combinations individually in succession to said hold conductor means as said digit change relay undergoes successive cycles of operation, commencing with said number one digit conductor combinations and ending with said number *n* digit conductor combination;

h. cross connection means comprising a cross connection field connecting: the counting conductor combination representative of the number of pulses for the number one in position digit to said first digit conductor combination; the counting conductor combination representative of the number of pulses for the number two in position digit to said second digit conductor combination; up to the counting conductor combination representative of the number of pulses for the number *n* in position digit to the *n*th digit conductor combination;

i. auxiliary hold conductor means connected to the counting conductor combination representative of said predetermined number of pulses of said interdigital timing interval; and j. a control circuit for said pulsing relay, said digit change relay, and said counting network means, said control circuit comprising:

1. means operative to short circuit said pulsing contact,
2. means responsive to a start signal from said telephone system to initiate free running action of said pulsing relay and to operate said means (j) (1) to short circuit said pulsing contact,
3. means connected to said auxiliary hold conductor means and responsive to appearance of said reference potential thereon when said means (j) (1) is operated to terminate said free running action and release said means (j) (1) to remove said short circuit from said pulsing contact,
4. means for resetting said counting network means to its initial condition upon each termination of pulsing of said counting contacts,
5. means for restarting said free running action of said pulsing relay after each termination of such free running action,
6. means connected to said hold conductor means and responsive to appearance of said reference potential thereon during free running action of said pulsing relay with said means (j) (1) released to terminate said free running action and operate said means (j) (1) to short circuit said pulsing contact, and
7. means for operating said digit change relay sequentially from its initial state on receipt of said start signal, through subsequent changes of state following each termination of said free running action, whereby, after transmission of the number of pulses required for a digit of said sequence, said reference potential is transmitted through said means (a), said counting network means, a selected counting conductor combination, said cross connection means, said digit conductors, said digit network means, and said hold conductor means to terminate free running action of said pulsing relay and hence transmission of pulses by said pulsing contact, and following such transmission of a digit, said control circuit reinitiates said free running action of said pulsing relay for an interdigital timing interval with said pulsing contact short circuited by said means (j) (1), the pulsing during such interdigital timing interval being terminated by appearance of said reference potential on said auxiliary hold conductor means, pulsing of the following digit of said sequence then commencing with a succeeding digit conductor combination connected to said hold conductor means.

6. Apparatus according to claim 4 including a plurality of transfer number relays each having a plurality of contacts, said cross connection means comprising a plurality of cross connection fields, one such cross connection field associated with each transfer number relay, and each cross connection field being connected between said counting and digit conductor through contacts of its associated transfer number relay, to permit connection of any one of said plurality of cross connection fields between said counting and digit conductors by selection of its associated transfer number relay, whereby a plurality of different sequences of digits may be transmitted, one such sequence for each transfer number relay.

7. Apparatus according to claim 4 including a cut-through relay, energizing means for said cut-through relay, means responsive to energization of said cut-through relay for terminating all further pulsing of said pulsing relay and for resetting said digit network means for fresh operation in pulsing a further sequence of digits upon receipt of a further start signal from said telephone system, and cut-through network means coupled between said cut-through relay and said energizing means, said cut-through network means including responsive to the condition of said digit network means for connecting said energizing means to said cut-through relay after said digit network means has connected said *n*th digit conductor combination to said hold conductor means.

8. For a telephone system, decoding apparatus for decoding a sequence of dialed digits received in dial pulse form on an incoming loop and for operating a selected relay upon completion of receipt of said digits provided that the digits received are those of a preselected sequence of *n* digits, said number *n* being at least three, the number one in position digit of said preselected sequence having a first predetermined number of pulses, the number two in position digit of said preselected sequence having a second predetermined number of pulses, up to the number *n* in position digit of said preselected sequence having an *n*th predetermined number of pulses, where said numbers of pulses may be from one to 10 in number, said selected relay being operative upon application of a reference potential thereto, said apparatus comprising:

a. a pulse receiving relay including counting contacts, and means for connecting said pulse receiving relay to be pulsed by pulses incoming on said loop, receipt of dial pulses on said incoming loop thus effecting pulsing of said counting contacts;

b. a slow release relay, and means connecting said slow release relay for operation upon commencement of receipt of a digit on said loop and for release following completion of receipt of such digit;

c. a plurality of counting conductors providing 10 different counting conductor combinations, namely a first counting conductor combination, a second counting conductor combination, up to a tenth counting conductor combination, each such combination comprising at least one counting conductor;

d. a normally closed contact of said slow release relay, and means for connecting one side of said normally closed contact to a source of said reference potential;

e. means for connecting individually in sequence said ten counting conductor combinations to the other side of said normally closed contact as said counting contacts undergo successive pulses, so that said first counting conductor combination is associated with receipt of one dial pulse, said second counting conductor combination is associated with receipt of two dial pulses, up to the tenth counting conductor combination being associated with receipt of ten dial pulses, comprising:

1. a plurality of counting relays each having a coil and a plurality of contacts,
2. means interconnecting the coils of said counting relays, selected contacts of said counting relays, and said counting contacts, for operation, upon pulsing of said counting contacts, of said counting relays in ten successive different combinations, one combination for each successive additional pulse of said counting contacts, thus providing different operation combinations of said counting relays for receipt of dial pulses from one to ten, said counting relays having an initial operating condition prior to completion of receipt of the first pulse of a digit, and
3. counting network means, including contacts of said counting relays, connected between said counting conductors and said other side of said normally closed contact and responsive to the operating condition of said counting relays for connecting said first counting conductor combination to said other side of said normally closed contact when said counting relays are operated in the first of their operating combinations, the second counting conductor combination to said other side of said normally closed contact when said counting relays are operated in the second of their operating combinations, up to the 10th counting conductor combination to said other side of said normally closed contact when said counting relays are operated in their tenth operating combination, said counting network having an initial released condition, when said counting relays are in their initial operative condition, in which none of said counting conductors are connected to said other side of said normally closed contact; and f. a decoding network coupled between said counting conductors and said selected relay and including:

1. $n$–1 decoding relay means, the first such decoding relay means being associated with the number one in position digit of said preselected sequence, up to the $n$–1 decoding relay means being associated with the number $n$–1 in position digit of said preselected sequence,
2. means connecting the first of said decoding relay means to the counting conductor combination associated with said first predetermined number of pulses, for said reference potential to be applied to said first decoding relay means upon completion of receipt of the number one in position digit of said preselected sequence and consequent release of said slow release relay, thus to operate said first decoding relay means,
3. means connecting each succeeding decoding relay means through a normally open contact of the immediately preceeding decoding relay means to the counting conductor combination associated with the number of dial pulses of the digit associated with such succeeding decoding relay means,
4. means responsive to operation of each decoding relay means for locking such decoding relay means operated,
5. means responsive to operation of each decoding relay means for placing said counting relays back in their initial condition, and
6. a normally open contact of said $n$–1 decoding relay means connected between the counting conductor combination associated with said $n$th predetermined number of pulses and said selected relay, so that after each digit of said preselected sequence is received, the decoding relay means associated with such digit is actuated, until, after receipt of all of said digits of said preselected sequence except the last, said $n$–1 decoding relay means is actuated, so that after receipt of the last digit of said preselected sequence and consequent release of said slow release relay, said reference potential is applied to operate said selected relay.

9. In a telephone system including first and second outgoing switching means, a line transfer circuit including first trip and ring leads connected to receive digits dialed by a subscriber, second tip and ring leads connected to receive incoming calls directed to said subscriber, and third tip and ring leads connected to said outgoing switching means, said line transfer circuit normally extending calls dialed by said subscriber through said first outgoing switching means, and normally routing incoming calls on said second tip and ring leads to said subscriber over said first tip and ring leads, said line transfer circuit transmitting, when a predetermined transfer code has been dialed and when an incoming call is received, over said third tip and ring leads the telephone number of a selected remote location and then cutting through a transmission path between said second and third tip and ring leads, said line transfer circuit comprising:

a. a transfer relay, a cancel relay, and a cut-through relay, each having a plurality of contacts;

b. a first series connection comprising normally closed contacts of said transfer relay and normally open contacts of said cancel relay, and means coupling said first tip and ring leads to said second tip and ring leads respectively through said first series connection;

c. a second series connection comprising normally open contacts of said transfer relay and normally open contacts of said cut-through relay, and means coupling said second tip and ring leads to said third tip and ring leads respectively through said second series connection;

d. means coupling said first tip and ring leads to said first outgoing switching means through normally open contacts of said cancel relay;

e. receiving means coupled to said first tip and ring leads to receive digits dialed by said subscriber;

f. decoding means coupled to said receiving means and responsive to receipt of digits dialed by said subscriber to operate said cancel relay when a code other then said transfer code or a predetermined restoration is dialed by said subscriber and to operate said transfer relay when said transfer code is dialed by said subscriber, said decoding means further including means responsive to receipt of said restoration code from said subscriber to release said transfer relay;

g. means responsive to receipt of a call on said second tip and ring leads to operate said cancel relay if said transfer relay is not operated, thus to effect connection of said second tip and ring leads to said first tip and ring leads respectively;

h. means operative for generating at said third tip and ring leads the telephone number of said selected remote location and for operating said cut-through relay upon completion of such generation; and i means responsive to receipt of a call over said second tip and ring leads when said transfer relay is operated, to operate said means (h) thus to generate at said third tip and ring leads said remote location telephone number and then to cut through a transmission path between said second and third tip and ring leads.

10. A line transfer circuit according to claim 9 for receiving a plurality of predetermined transfer codes and for generating at said third tip and ring leads a plurality of different remote location telephone numbers, one such remote location telephone number associated with each transfer code, wherein:

j. said decoding means includes:
  1. a plurality of transfer number relays, one associated with each transfer code, and
  2. means connecting said transfer number relays for operation, upon receipt by said receiving means of one of said transfer codes, of the transfer number relay associated with such transfer code; and k. said means (h) includes:
  1. a plurality of cross connection fields, one associated with each transfer number relay,
  2. means connecting each cross connection field for operation upon operation of its associated transfer number relay, and
  3. means connecting said cross connection fields for operation of a cross connection field to determine the respective digits of the remote location telephone number generated.

11. A line transfer circuit according to claim 10 wherein said receiving means include a pulse receiving relay connected to said first tip and ring leads through normally closed contacts of said cancel relay, and a normally open contact of said pulse receiving relay connected across said first outgoing switching means to repeat pulses of said pulse receiving relay to said first outgoing switching means.

12. Apparatus according to claim 11 including a third sleeve lead associated with said third tip and ring leads, wherein said pulse receiving relay includes first counting contacts, and wherein said means (f) to (i) together include:

1. a first holding relay, and means connecting said first holding relay for operation during receipt of digits from said subscriber over said first tip and ring leads, said first holding relay including a first hold contact;
2. a second holding relay, and means connecting said second holding relay for operation during receipt of a call over said second tip and ring leads with said transfer relay operated, said second holding relay including a second hold contact;
3. a pulsing relay having a pulsing contact connected across said third tip and ring leads for transmission of dial pulses, and having second counting contacts, pulsing of said pulsing relay operating and releasing said pulsing and said second counting contacts;
4. a plurality of counting terminals providing 10 different counting terminal combinations, a first combination associated with one pulse, a second combination associated with two pulses, up to a tenth combination associated with ten pulses, each combination comprising at least one counting terminal;
5. means normally connected to a source of reference potential;
6. actuating means comprising a connection of said first counting contacts and said first hold contact, and a connection of said second counting contacts and said second hold contact, for pulsing of said actuating means upon pulsing of said first counting contacts with said first hold contact operated and upon pulsing of said second counting contacts with said second hold contact operated;
7. counting network means responsive to the number of pulses of said actuating means upon initiation of pulsing of the latter with said first or second holding relay operated, to connect said ten counting terminal combinations in succession to said means (5) so that said first to tenth counting terminal combinations correspond to one to ten pulses of said actuating means respectively, said counting network means having an initial released condition which none of said counting terminal combinations are connected to said means (5);
8. a plurality of counting conductors arranged in first and second sets of counting conductor combinations each, the counting conductor combinations of each set corresponding respectively to said counting terminal combinations, each counting conductor combination comprising at least one counting conductor;
9. routing relay means having first and second operating conditions, for connecting the counting conductor combinations of said first set to the respective counting terminal combinations when said routing relay is in its first operating condition and for connecting the counting conductor combinations of said second set to the respective counting conductor combinations when said routing relay means is in its second operating condition;
10. means for placing said routing relay in its first operating condition during receipt of digits from said subscriber over said first tip and ring leads when said cancel relay is released, and for placing said routing relay in its second operating condition upon receipt of a call over said second tip and ring leads with said transfer relay operated, the respective counting conductor combinations of said first set being associated with respective numbers of dial pulses received from said subscriber when said cancel relay is released, and the respective counting conductor combinations of said second set being associated with respective numbers of dial pulses to be transmitted over said third set of tip and ring leads;
11. decoding network means connected between said first set of counting conductor combinations, and said transfer relay and transfer number relays and comprising: means coupled to said means (5) for disconnecting said means (5) from said source during receipt of a transfer code digit from said subscriber and for connecting said means (5) to said source upon completion of receipt of a transfer code digit from said subscriber, for application of said reference potential to the counting conductor combination of said first set associated with the number of pulses in the digit dialed by said subscriber; means responsive to receipt of said reference potential from a counting conductor combination of said first set for resetting said counting conductor network means back to its initial condition preparatory to receipt of a further digit thus to terminate the appearance of said reference potential on such counting conductor combination; means responsive to receipt of said reference potential in sequence on counting conductor combinations of said first set associated respectively with the dial pulses of the digits of one of said transfer codes, for energizing said transfer relay and the transfer number relay associated with such transfer code; and means responsive to receipt of said reference potential in sequence on counting conductor combinations of said first set associated respectively with dial pulses of a sequence of digits other than those of one of said transfer codes for energizing said cancel relay;
12. a digit change relay having an operated and a released condition;
13. a plurality of digit conductors providing a plurality of different digit conductor combinations, one for each digit position of the telephone numbers of the remote locations, a number one digit conductor combination thus being associated with the number one in position digit of each remote location telephone number, up to a last digit conductor combination associated with the last in position digit of the remote location telephone numbers, each of said digit conductor combinations comprising at least one digit conductor;
14. hold conductor means, 15. digit network means coupled between said digit conductors and said hold conductor means and responsive to changes in state of said digit change relay to connect successive different digit conductor combinations to said hold conductor means as said digit change relay undergoes changes in state with said second holding relay operated;

16. each of said cross connection fields coupling: the counting conductor combination of said second set associated with the number of pulses of the number one in position digit of its associated remote location telephone number to said first digit conductor combination, up to the counting conductor combination of said second set associated with the number of pulses of the last in position digit of its associated remote location telephone number to the last digit conductor combination; and 17. a pulsing control circuit for said pulsing relay, said digit change relay, and said counting network means, comprising: means responsive to receipt of a call on said second tip and ring leads with said transfer relay operated to operate said pulsing relay to close said pulsing contact and seize said second outgoing switching means; means responsive to a start signal from said third sleeve lead upon seizure of said second outgoing switching means to initiate free running action of said pulsing relay and hence pulsing of said actuating means; means connected to said hold conductor means and responsive to receipt of said reference potential thereon for terminating said free running action; means for restarting said free running action after termination thereof; and means for stepping said digit change relay through successive changes of state as said free running actions starts and stops, thus to effect connection of successive digit conductor combinations to said hold conductor means, so that after transmission of the number of pulses required for a digit of a said remote location telephone number, said reference potential is transmitted through said means (5), said counting network means, said counting terminals, said routing relay means, a counting conductor combination of second set, the cross connection field associated with such remote location telephone number, one of said digit conductor combinations, said digit network means, and said hold conductor means to terminate said free running action of said pulsing relay, and following such transmission of a digit, said digit change relay is pulsed to effect connection of a succeeding digit conductor combination to said hold conductor means.

13. Apparatus according to claim 12 wherein said transfer code has $n$ digits, the first $n$–1 in position digits being the same for each transfer code and the $n$th in position digits being different, each $n$th digit being associated with a different transfer number relay and thus determining the remote number to be outpulsed, and wherein, in said means (11), said means responsive to receipt of said reference potential in sequence on said counting conductor combinations of said first set includes: $n$–1 decoding relays, the first decoding relay associated with the number one in position digit of said transfer codes, up to the $n$–1 decoding relay being associated with the $n$–1 in position digit of said transfer code, means connecting the first decoding relay to the counting conductor combination of said first set associated with the number of pulses of the first digit of said transfer codes; means connecting each succeeding decoding relay through a normally open contact of the immediately preceding decoding relay to the counting conductor combination of said first set associated with the number of pulses of the digit associated with such succeeding decoding relay; means responsive to operation of each decoding relay for locking such decoding relay operated; and means including a normally open contact of said $n$–1 decoding relay connected between each transfer number relay and the counting conductor combination associated with the number of pulses in the $n$th digit associated with such transfer number relay 14. Apparatus for generating a predetermined sequence of $n$ digits, commencing with a number one in position digit and ending with a number $n$ in position digit, each digit comprising a number of pulses, said apparatus comprising:

a. a plurality of counting conductors providing ten counting conductor combinations, namely, a first counting conductor combination to a last counting conductor combination, each counting conductor combination comprising at least one counting conductor;

b. a source of reference potential;

c. pulsing means for generating said pulses; said pulsing means being coupled to said source (b) and comprising:

1. means for placing said reference potential on: the first counting conductor after one pulse, the second counting conductor combination after two pulses, up to the 10th counting conductor combination after 10 pulses, the first counting conductor combination thus being associated with one pulse, up to the last counting conductor combination being associated with 10 pulses;
2. hold conductor means responsive to appearance of said reference potential thereon for terminating generation of said pulses;
3. means for restarting generation of said pulses after a predetermined timing period following termination of generation of pulses;

d. a plurality of digit conductors providing $n$ different digit conductor combinations, namely, a first digit conductor combination associated with the number one in position digit of said sequence, up to an $n$th digit conductor combination associated with the number $n$ in position digit of said sequence;

e. means for connecting the first digit conductor combination to said hold conductor means during generation of the pulses of the number one in position digit of said sequence, up to the $n$th digit conductor combination to said hold conductor means during generation of the pulses of the $n$th in a position digit of said sequence; and f. cross connection means connected between: the counting conductor combination associated with the number of pulses of the number one in position digit of said sequence and the first digit conductor combination, up to the counting conductor combination associated with the number of pulses of the number $n$ in position digit of said sequence and the $n$th digit conductor combination, whereby after generation of the number of pulses for a digit of said sequence, said reference potential is applied through said counting conductors, said cross connection means, and the digit conductor combination associated with such digit, to said hold conductor means to terminate pulse generation, and pulse generation then recommences after said timing period with the next digit conductor combination connected to said hold conductor means, said cross connection means including:

1. a plurality of transfer number relays, each having a plurality of contacts;
2. a plurality of cross connection fields each associated with a transfer number relay; and
3. means connecting each cross connection field between said counting and digit conductors through contacts of its associated transfer number relay, whereby a plurality of different sequences of digits may be generated, one sequence for each transfer number relay.

15. In a telephone line transfer circuit of the type including a first pair of leads for receiving digits transmitted by a subscriber, a second pair of leads for receiving incoming calls directed to said subscriber, transfer switch means having a first condition in which it couples said second pair of leads to said first pair of leads and a second condition in which it couples said second pair of leads to outgoing switching means, generating means responsive to receipt of a call over said second pair of leads when said transfer switch means is in its second condition for generating at said outgoing switching means a remote telephone number and then connecting said second pair of leads through to said outgoing switching means: control means for switching said transfer switch means from its first to its second condition only when said predetermined transfer code is transmitted by said subscriber, said predetermined transfer code being a preselected sequence of *n* digits, said number *n* being at least three; the number one in position digit of said sequence having a first predetermined value, the number two in position digit of said sequence having a second predetermined value, up to the number *n* in position digit of said sequence having an *n*th predetermined value, where said values may be from one to 10, said control means including decoding means comprising:

a. a plurality of counting conductors, said counting conductors providing a plurality of different counting conductor combinations, one combination associated with and representing the value of each of the digits that may be received, each combination comprising at least one counting conductor;
b. means for connection to a source of reference potential;
c. counting means adapted to receive said digits, said counting means including network means coupled between said counting conductors and said means (b), said counting means having an initial released condition and being operative from said initial condition in response to a received digit for connecting after receipt of such digit, the counting conductor combination representing the digit received through said network means to said means (b), for said reference potential to appear on the counting conductor combination representative of the value of the digit just received; and
d. a decoding network coupled between said counting conductors and said transfer switch means, said decoding network comprising:
    1. *n*–1 decoding switch means, the first such decoding switch means being associated with the number one in position digit of said sequence, up to the *n*–1 decoding switch means being associated with the number *n*–1 in position digit of said sequence;
    2. means connecting the first of said decoding switch means to the counting conductor combination associated with said first predetermined value, for said reference potential to be applied to said first decoding switch means upon completion of receipt of the number one in position digit of said sequence, thus to operate said first decoding switch means;
    3. means connecting each succeeding decoding switch means through a normally open switch element of the immediately preceding decoding switch means to the counting conductor combinations associated with the value of the digit associated with such succeeding decoding switch means;
    4. means responsive to operation of each decoding switch means for locking such decoding switch means operated;
    5. means responsive to operation of each decoding switch means for placing said counting means back in its initial condition;
    6. and a normally open switching element of said *n*–1 decoding switch means connected between the counting conductor combinations associated with said *n*th predetermined value and said transfer switch means; and
    7. said transfer switch means including means responsive to application of said reference potential to said transfer switch means for placing said transfer switch means in its second condition, so that after each digit of said preselected sequence is received, the decoding switch means associated with such digit is actuated, until, after receipt of all of said digits of said sequence except the last, said *n*–1 decoding switch means is actuated, so that after receipt of the last digit of said sequence, said reference potential is applied to place said transfer switch means in its second condition.

16. A line transfer circuit according to claim 15 and responsive to a plurality of predetermined transfer codes, each differing only in the *n*th digit thereof, for generating a plurality of predetermined remote telephone numbers, one for each transfer code, wherein:

e. said transfer switch means includes a plurality of individual transfer switches, each representing a different value last digit of said transfer codes and each being connected through a normally open switching element of said *n*–1 decoding switch means to the counting conductor combination representing the digit value which such individual transfer switch represents, so that when a transfer code having a particular last digit is transmitted, the individual transfer switch representing such last digit will be operated, and
f. said generating means including means responsive to the individual transfer switch operated to generate a remote telephone number determined by such operated individual transfer switch.

17. A telephone system according to claim 9 wherein said means h includes pulse generating apparatus comprising:

A. a pulsing relay, including a set of counting contacts, said pulsing relay having an operated condition and a released condition;
B. control circuit means connecting said pulsing relay for free running change of state action of said pulsing relay, thus effecting pulsing of said counting contacts;
C. means coupled to said means (B) for selectively initiating and terminating said free running action of said pulsing relay;
D. a plurality of counting conductors;
E. means for connection to a source of reference potential;
F. network means coupled between said counting conductors and said means (E) and responsive to the number of pulses of said counting contacts after initiation of said free running action to connect successive different counting conductors to said means (E) as said counting contacts undergo successive pulses;
G. hold conductor means, and means connecting said hold conductor means to said means (C) for appearance of said reference potential on said hold conductor means to terminate free running action of said pulsing relay; and
H. means for connecting said hold conductor means to at least one selected counting conductor, so that after occurrence of a predetermined number of pulses of said counting contacts, said network means couples said means (E) to said at least one selected counting conductor and thence through said means (H) to said hold conductor means to terminate said free running action of said pulsing relay.

18. Apparatus according to claim 17 wherein said means (H) comprises:

I. a digit change relay, including a set of digit change contacts having an operated condition and a released condition;
J. means coupled between said digit change relay and said means (C) for stepping said digit change relay through at least one change of state following termination of said free running action of said pulsing relay;
K. a plurality of digit conductors;
L. cross connection means connecting said counting conductors and said digit conductors; and
M. digit network means coupled between said digit conductors and said hold conductor means and responsive to changes in condition of said digit change contacts to connect different digit conductors to said hold conductor means as said digit change contacts undergo changes in condition, for varying, following each termination of free running action of said pulsing relay, said at least one counting conductor coupled to said hold conductor means, so that following occurrence of said predetermined number of pulses of said counting contacts and consequent connection of said reference potential to said at least one counting conductor and thence through said cross connection means, said digit conductors, and said digit network means to said hold conductor means to terminate said free running action of said pulsing relay, said digit change relay is stepped through at least one change of state for said digit network means to connect a new counting conductor to said hold conductor means.

19. A telephone system according to claim 9 wherein said means (h) includes pulse generating apparatus comprising:

A. a pulsing relay having a coil and counting contacts, said pulsing relay having an operated state and a released state;

B. control circuit means connecting the coil of said pulsing relay for free running change of state action of said pulsing relay, thus effecting pulsing of said counting contacts;

C. means coupled to said means (B) for selectively initiating and terminating said free running action of said pulsing relay;

D. a plurality of counting relays each having a coil and a plurality of contacts;

E. counting circuit means interconnecting the coils of said counting relays, selected contacts of said counting relays, and said counting contacts for operation, upon pulsing of said counting contacts, of said counting relays in a plurality of successive different operating combinations as said counting contacts undergo successive pulses;

F. an output circuit for said counting relays, said output circuit comprising:
  1. a plurality of counting conductors,
  2. means for connection to a source of reference potential; and
  3. counting network means, including contacts of said counting relays, coupled between said counting conductors and said means (F) (2) for connecting successive different counting conductors to said means (F) (2) for successive different operating combinations of said counting relays, the appearance of said reference potential on different counting conductors indicating occurrence of different numbers of pulses of said counting contacts;

G. hold conductor means, and means connecting said hold conductor means to said means (C) for appearance of said reference potential on said hold conductor means to terminate free running action of said pulsing relay, and H. means for connecting said hold conductor means to at least one selected counting conductor, so that after occurrence of a predetermined number of pulses of said counting contacts, said counting relays reach an operating combination to connect said means (F) (2) through said counting network means, said at least one counting conductor, and said means (H) to said hold conductor means to terminate said free running action of said pulsing relay.

20. Apparatus according to claim 19 wherein said means (H) comprise:

I. a digit change relay having a coil and digit change contacts, said digit change relay having an operated state and a released state;

J. means coupled between said digit change relay and said means (C) for stepping said digit change relay through at least one change of state following termination of pulsing of said counting contacts;

K. a plurality of digit relays each having a coil and a plurality of contacts;

L. means interconnecting the coils of said digit relays, selected contacts of said digit relays, and said digit change contacts for operation, upon change of state of said digit change contacts, of said digit relays in a plurality of successive different operating combinations as said digit change contacts undergo successive changes in condition;

M. an output circuit for said digit relays, said output circuit comprising:
  1. a plurality of digit conductors, and
  2. digit network means, including contacts of said digit conductors, coupled between said digit conductors and said hold conductor means for connecting different digit conductors to said hold conductor means for different operating combinations of said digit relays; and N. cross connection means connecting said counting conductors and said digit conductors, so that, following occurrence of said predetermined number of pulses and consequent connection of said reference potential to said at least one counting conductor and thence through said cross connection means, said digit conductors, and said digit network means to said hold conductor means to terminate said free running action of said pulsing relay, said digit change relay changes state at least once to effect a new operating combination of said digit relays for said digit network means to connect a new counting conductor to said hold conductor means.

21. Apparatus according to claim 20 including a plurality of transfer number relays each having a plurality of contacts, said cross connection means (N) comprising a plurality of cross connection fields, one such cross connection field associated with each transfer number relay and each cross connection field being coupled between said counting and digit conductors through contacts of its associated transfer number relay, so that any one of said plurality of cross connection fields may be connected between said counting and digit conductors by selection of its associated transfer number relay.

22. A telephone system according to claim 9 wherein said means (h) includes a pulsing relay having a pulsing contact for transmission of dial pulses, said pulsing relay also having counting contacts, pulsing of said pulsing relay operating and releasing said pulsing and counting contacts; and a control system for pulsing said pulsing relay to effect transmission by said pulsing contact of a predetermined sequence of digits, the digits of said sequence being *n* in number, namely, a number one in position digit, a number two in position digit, up to a number *n* in position digit, each digit being represented by a number of pulses of said pulsing contacts, with an interdigital timing interval between each digit of said sequence, said interdigital timing interval comprising a predetermined number of pulses of said pulsing contact with said pulsing contact short circuited, said control system comprising:

A. means for connection to a source of reference potential;

B. a plurality of counting conductors for providing ten different counting conductor combinations, namely, a first counting conductor combination, a second counting conductor combination, up to a tenth counting conductor combination;

C. counting network means coupled between said means (A) and said counting conductors and responsive to the number of pulses of said counting contacts after initiation of pulsing of said pulsing relay to connect individually in succession said ten counting conductor combinations to said means (A) as said counting contacts undergo successive pulses, said first counting conductor combination thus being associated with one pulse of said pulsing contacts, said second counting conductor combination being associated with two pulses of said pulsing contacts, up to said tenth counting conductor combination being associated with ten pulses of said pulsing contacts, said counting network means having an initial released condition in which none of said counting conductor combinations are connected to said means (A);

D. a digit change relay having an operated condition and a released condition, and having an initial state in which it is in one of its conditions;

E. a plurality of digit conductors for providing *n* different digit conductor combinations, one such combination for each of the *n* digits of said sequence, namely, a number one digit conductor combination associated with the number one in position digit of said sequence, a number two digit conductor combination associated with the number two in position digit of said sequence, up to a number *n* digit conductor combination associated with the number $n$ in position digit of said sequence, each of said digit conductor combinations comprising at least one digit conductor.

F. hold conductor means;

G. digit network coupled between said digit conductors and said hold conductor means and responsive to changes in state of said digit change relay to connect said digit conductor combinations individually in succession to said hold conductor means as said digit change relay undergoes successive cycles of operation, commencing with said number one digit conductor combination and ending with said number $n$ digit conductor combination;

H. cross connection means comprising a cross connection field connecting: the counting conductor combination representative of the number of pulses for the number one in position digit to said first digit conductor combination; the counting conductor combination representative of the number of pulses for the number two in position digit to said second digit conductor combination; up to the counting conductor combination representative of the number of pulses for the number $n$ in position digit to the $n$th digit conductor combination;

I. auxiliary hold conductor means connected to the counting conductor combination representative of said predetermined number of pulses of said interdigital timing interval; and J. a control circuit for said pulsing relay, said digit change relay, and said counting network means, said control circuit comprising:

1. means operative to short circuit said pulsing contact,
2. means responsive to a start signal from said telephone system to initiate free running action of said pulsing relay and to operate said means (J) (1) to short circuit said pulsing contact,
3. means connected to said auxiliary hold conductor means and responsive to appearance of said reference potential thereon when said means (J) (1) is operated to terminate said free running action and release said means (J) (1) to remove said short circuit from said pulsing contact,
4. means for resetting said counting network means to its initial condition upon each termination of pulsing of said counting contacts,
5. means for restarting said free running action of said pulsing relay after each termination of such free running action,
6. means connected to said hold conductor means and responsive to appearance of said reference potential thereon during free running action of said pulsing relay with said means (J) (1) released to terminate said free running action and operate said means (J) (1) to short circuit said pulsing contact, and
7. means for operating said digit change relay sequentially from its initial state on receipt of said start signal, through subsequent changes of state following each termination of said free running action, whereby, after transmission of the number of pulses required for a digit of said sequence, said reference potential is transmitted through said means (A), said counting network means, a selected counting conductor combination, said cross connection means, said digit conductors, said digit network means, and said hold conductor means to terminate free running action of said pulsing relay and hence transmission of pulses by said pulsing contact, and following such transmission of a digit, said control circuit reinitiates said free running action of said pulsing relay for an interdigital timing interval with said pulsing contact short circuited by said means (J) (1), the pulsing during such interdigital timing interval being terminated by appearance of said reference potential on said auxiliary hold conductor means, pulsing of the following digit of said sequence then commencing with a succeeding digit conductor combination connected to said hold conductor means.

23. A telephone line transfer circuit for actuation upon receipt from a subscriber of any one of a plurality of predetermined transfer codes and for deactivation upon receipt from said subscriber of a predetermined restoration code, said line transfer circuit comprising:

a. first leads for receiving digits from said subscriber, b. cancel switch means coupling said first leads to first outgoing switching means and having a first normal condition in which said cancel switch means disconnects said first leads from said first outgoing switching means and a second condition in which said cancel switch means connects said first leads to said first outgoing switching means, c. receiving means coupled to said first tip and ring leads and responsive to the condition of said cancel switch means to repeat digits dialed by a subscriber to said first tip and ring leads when said cancel switch means is in its first condition and being inoperative when said cancel switch means is in its second condition, d. second leads for receiving incoming calls directed to said subscriber, e. transfer switch means having a first condition in which it couples said second leads to said first leads and a second condition in which it couples said second leads to second outgoing switching means, f. decoding means coupled to said receiving means and responsive to receipt of digits dialed by said subscriber to switch said cancel switch means to its second condition when a code other than a said transfer code or a predetermined restoration code is dialled by said subscriber, said decoding means including means responsive to receipt of a said transfer code from said subscriber, when said transfer switch is in its first condition, to switch said transfer switch means from its first to its second condition and to leave said transfer switch means in its first condition when a code other than said transfer code is received from said subscriber, said decoding means further including means responsive to receipt of said restoration code from said subscriber, when said transfer switch is in its second condition, to switch said transfer switch means from its second to its first condition and to leave said transfer switch means in its second condition when a code other than said restoration code is received from said subscriber, g. said decoding means also including a plurality of transfer number switches, one associated with each transfer code, and means connecting said transfer number switches for operation of one of said transfer number switches upon receipt from said subscriber of the transfer code associated with said one of said transfer number switches, h. generating means responsive to receipt of a call over said second leads when said transfer switch means is in its second condition for generating at said second outgoing switching means a remote telephone number and then connecting said second leads through to said second outgoing switching means, and i. said generating means including:

i. switching matrix means for generating the respective digits associated with telephone numbers, and ii. a plurality of cross connection means commonly associated with said switching matrix means and individually associated with said transfer number switches for determining the order in which telephone number digits are generated upon operation of a given transfer number switch.